United States Patent [19]

Holender

[11] Patent Number: 5,729,548

[45] Date of Patent: Mar. 17, 1998

[54] HIGH-SPEED OPTICAL DATA SWITCHING SYSTEM

[75] Inventor: Wlodek Holender, Lund, Sweden

[73] Assignee: Telefonaktiebolaget LM Ericsson (publ.), Stockholm, Sweden

[21] Appl. No.: 581,159

[22] Filed: Dec. 29, 1995

[51] Int. Cl.[6] .................................................. H04J 3/24
[52] U.S. Cl. ........................ 370/474; 370/395; 359/139; 359/165
[58] Field of Search ................................ 370/395, 396, 370/397, 409, 389, 390, 474, 465, 470, 971, 476; 359/139, 165

[56] References Cited

U.S. PATENT DOCUMENTS

| | | | |
|---|---|---|---|
| 3,775,602 | 11/1973 | Alexandridis et al. | 235/156 |
| 4,015,115 | 3/1977 | Corcoran | 250/199 |
| 4,989,199 | 1/1991 | Rzeszewski | 370/1 |
| 5,050,952 | 9/1991 | Fussgäger | 359/114 |
| 5,073,980 | 12/1991 | Prucnal et al. | |
| 5,101,441 | 3/1992 | Yamaguchi | 382/30 |
| 5,105,292 | 4/1992 | Le Roy et al. | |
| 5,129,058 | 7/1992 | Mifune et al. | 395/162 |
| 5,289,303 | 2/1994 | Cloonan et al. | 359/139 |
| 5,293,434 | 3/1994 | Feig et al. | 382/56 |
| 5,303,078 | 4/1994 | Brackett et al. | 359/139 |
| 5,315,423 | 5/1994 | Hong | 359/124 |
| 5,325,224 | 6/1994 | Lang et al. | 359/139 |
| 5,339,187 | 8/1994 | Nelson | 359/182 |
| 5,341,441 | 8/1994 | Maeda et al. | 382/56 |
| 5,353,110 | 10/1994 | Jones | 356/73.1 |
| 5,363,228 | 11/1994 | DeJule et al. | 359/117 |
| 5,383,045 | 1/1995 | Vogel et al. | 359/158 |
| 5,384,868 | 1/1995 | Maeda et al. | 382/56 |
| 5,450,225 | 9/1995 | Bostica et al. | 359/139 |
| 5,568,300 | 10/1996 | Ishibashi | 359/139 |
| 5,600,469 | 2/1997 | Yamataki | 370/395 |

FOREIGN PATENT DOCUMENTS 0 541 983 A1  5/1993  European Pat. Off.
WO 93/21706  10/1993  European Pat. Off.
2 709 839  3/1995  France.

OTHER PUBLICATIONS

IEEE Photonics Technology Letters, vol. 7, No. 2, Feb. 1995, New York US, pp. 212–214, XP000488101, Tsushima, et al.: "Demonstration of an Optical Packet Add/Drop with Wave Length–Coded Header".

Ken-ichi Kitayama, Novel Spatial Spread Spectrum Based Fiber Optic CDMA Networks for Image Transmission, 12 IEEE Journal on Selected Areas in Communications 762–772 (IEEE May 1994).

Primary Examiner—Douglas W. Olms
Assistant Examiner—Ajit Patel
Attorney, Agent, or Firm—Jenkens & Gilchrist, P.C.

[57] ABSTRACT

A system and method for high-speed parallel switching of digital data sequences using an all-optical technique is described. Each input digital data sequence is encoded into an optical pattern comprising of several cells. The encoded optical pattern can be of various sizes and shapes depending on cost and quality considerations. A unique modulating pattern is selected for each digital data sequence based on the destination address of that data sequence. Every cell of each encoded optical pattern is modulated using the selected modulating pattern to obtain a modulated-encoded optical pattern. Each modulated-encoded optical pattern corresponds to a specific input data sequence. All of the modulated-encoded optical patterns are superposed to obtain a composite modulated-encoded optical pattern. The composite pattern is optically broadcast to all possible outputs of the parallel switch. All the destination receivers simultaneously demodulate the composite pattern using the unique modulating pattern that corresponds to their destination address and thus extract the encoded data sequence sent to them. The demodulated-encoded data sequences are decoded back from optical to digital form and routed to their destination by conventional techniques.

24 Claims, 16 Drawing Sheets

Legend

○ Local Exchange  □ Mobile Exchange
△ Trunking Exchange  ⬠ Remote Subscriber Multiplexer

HIGH-SPEED OPTICAL DATA SWITCHING SYSTEM

TECHNICAL FIELD OF THE INVENTION

The invention relates to electronic data switching systems, and more particularly, to the use of optical techniques in the implementation of ultra-high-speed ATM switching systems.

DESCRIPTION OF RELATED ART

The demand for telecommunications services has been growing at an ever-increasing rate. In order to meet this demand, telecommunications network operators and suppliers have had to continuously upgrade the traffic carrying capacity of both their circuits as well as of the switch nodes interconnecting those circuits. Moreover, the demand for ordinary voice telephone service is becoming a decreasingly smaller part of the overall traffic in comparison to other telecommunications services such as data communications between computers, graphical image transmissions, video-conferencing and similar broadband services.

Current and future telecommunications subscribers, both residential and business, will be connected, via common accesses, to a web of broadband networks operating at data rates of 150 megabits per second or above and which can support a wide range of different types of broadband services. Broadband networks may be generally defined as those which support user services requiring bit transfer rates substantially in excess of one megabit per second.

In general, broadband networks are likely to be built using Asynchronous Transfer Mode (ATM) technology as the underlying type of transport and switching technology. Broadband Integrated Services Digital Networks (B-ISDN), employing ATM technology, can offer users the flexibility and capacity necessary to support diverse telecommunication services ranging from basic voice telephone service to high-speed data transfer, video telephony, and high-quality television signal distribution. As further described below, ATM technology relies upon the compartmentalization of data into packets or cells which are transmitted and switched as individual units through the various nodes in the broadband network.

Current large telephone central offices may serve up to 100,000 customers. Based upon such a large number of terminals, a future B-ISDN central office may be required to operate at a switching capacity of up to one terabit per second ($10^{12}$ bits per second) or greater. Assuming that each customer is served with a B-ISDN line operating at the design throughput level of 155.52 megabits per second, an ATM exchange switch needs to be able to handle a throughput in excess of 15 terabits per second.

Several proposals have been made to handle such tremendously fast switching requirements within the architecture of large data switches such as those used in ATM implementations. For example, U.S. Pat. No. 5,303,078 entitled "Apparatus and Method for Large Scale ATM Switching" issued to Brackett et al. proposes a combination of electronic and optical switching. The Brackett system employs a multiple broadcast optical star network with tunable lasers and fixed tuned receivers to implement an ATM packet switch. However, the Brackett technique suffers from a number of disadvantages since it is complex. The Brackett technique is also expensive and slow since it involves multiple conversions between electronic and optical representations of data.

It is also known to utilize optical techniques along with code division multiple access (CDMA) to encode an optical image with another and then transmit a plurality of encoded images to a remote location where they are decoded and separated from one another. See, e.g., K. Kitayama, *Novel Spatial Spread Spectrum Based Fiber Optic CDMA Networks for Image Transmission*, 12 IEEE JOURNAL ON SELECTED AREAS IN COMMUNICATIONS 762–772 (May 1994). However, there have been no teachings suggesting the use of such optical techniques in the implementation of high-speed data switching systems, such as for use in ATM switching environments.

The system of the present invention combines conventional high-speed ATM switching techniques with optical processing technology to produce a parallel switching system having remarkably high data throughput rates in the ten terabits per second range for a ten-input ten-output switch configuration.

SUMMARY OF THE INVENTION

Therefore, it is a primary object of the present invention to increase the speed of telecommunications switches by adapting optical encoding-decoding techniques to telecommunications applications. The use of an optical encoding-decoding technique permits multiple data streams to be switched in parallel.

In one aspect, the present invention relates to a system and method for the high-speed parallel switching of digital data sequences using an all-optical technique. The method includes separating the address portion of each digital data sequence from the payload portion of the digital data sequence. The destination output port of each digital data sequence is then determined using the address portion of the digital data sequence. A unique optical pattern that corresponds to the destination output port is generated next. This unique optical pattern is used for modulating the payload portion of the digital data sequence and can either be generated ab initio or by selection from a precalculated list.

An encoded optical pattern comprising a plurality of cells is then constructed by encoding each of the digital data sequences using a preselected conversion protocol. Each cell of this encoded optical pattern is then modulated using the unique modulating optical pattern that corresponds to the destination of the data sequence.

The modulated optical patterns obtained from each of the digital data sequences are superposed to form a composite optical pattern that is broadcast to a plurality of destination receivers. The composite optical pattern are then demodulated in each of the destination receivers using the unique modulating optical pattern that corresponds to the destination receiver's address. Finally, the demodulated optical pattern are decoded at each output port to obtain a switched time-domain digital data sequence that is routed to its destination by conventional means.

BRIEF DESCRIPTION OF THE DRAWINGS

A more complete understanding of the method and system of the present invention may be obtained by reference of the detailed description of the preferred embodiments that follows, taken in conjunction with the accompanying drawings, wherein.

DESCRIPTION OF THE PREFERRED EMBODIMENT

Telecommunications Networks

Figure 1:
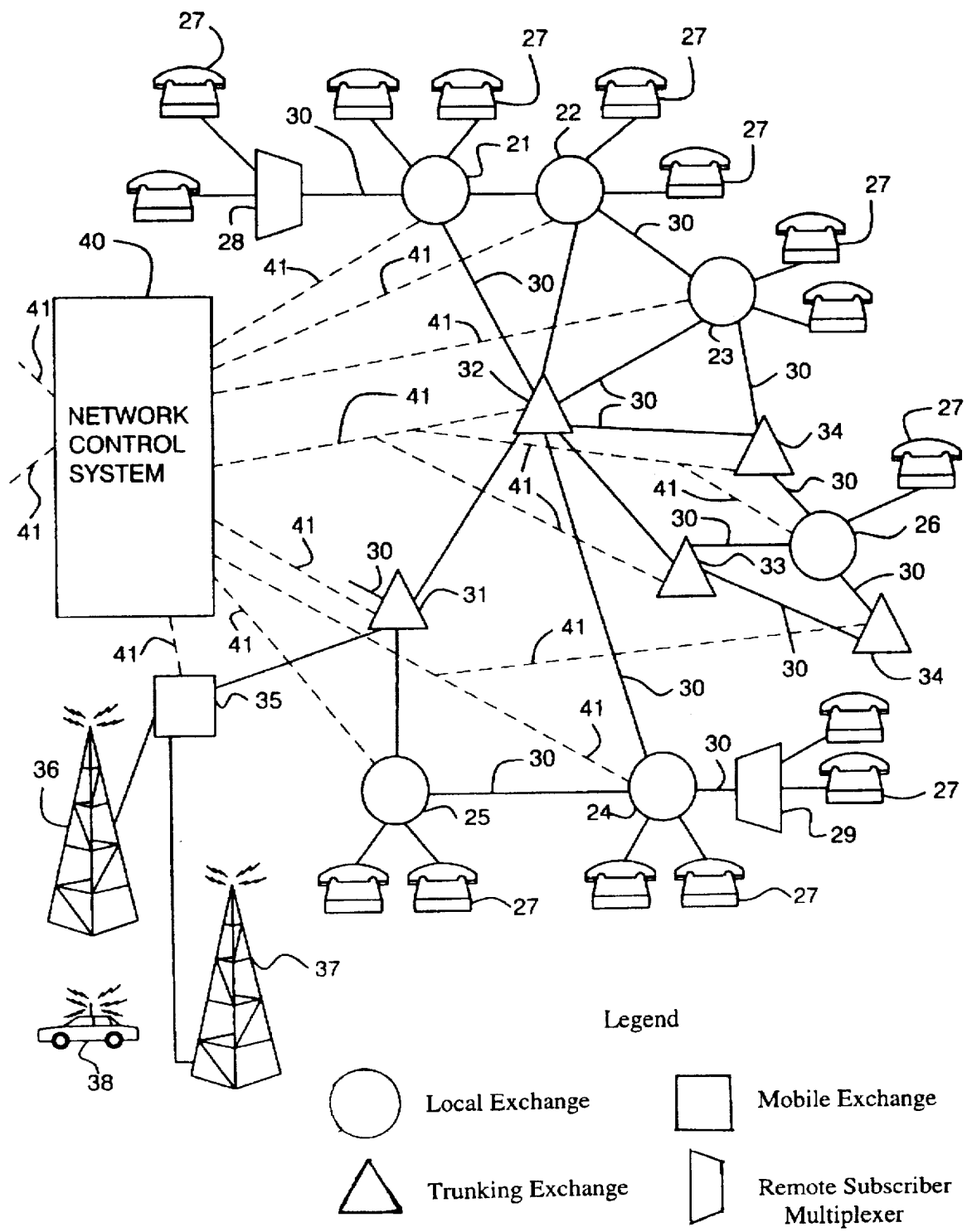
FIG. 1 is a block diagram of an illustrative telecommunications network within which the data switching system of the present invention may be employed.

Referring first to FIG. 1 there is shown an illustrative schematic diagram of a conventional public telecommunications network including a plurality of local exchanges 21 to 26, each of which have a plurality of local subscribers connected thereto and represented by telephone instruments 27. Two of the local exchanges 21 and 24 are represented as having remote subscriber multiplex stages 28 and 29 associated therewith which, in turn, have local customers 27 connected thereto. The network of FIG. 1 also includes a plurality of trunking exchanges 31 to 34 which serve primarily to interconnect various local exchanges with one another and to provide routes between various parts of the network. Trunk exchange 31 is shown connected to a mobile exchange 35 which includes a pair of illustrative base stations 36 and 37 serving a plurality of mobile radio telephone subscribers represented at 38.

In addition, other telecommunications services such as databases and intelligent networks may also be connected to various ones of the exchanges shown. Between each of the exchanges 21 to 35 in the network, there are shown a plurality of communication paths 30, each of which may comprise a plurality of communication circuits, including cables, optical links or radio links for carrying voice and/or data communication between the various exchanges within the network.

The network of FIG. 1 also includes a network control system 40 which is connected to each of the exchanges 21 to 35 within the network by means of communication links 41 (represented by dotted lines) for the transmission of control signals to each exchange and for the reception of traffic data from each exchange. The network control system 40 issues commands to dynamically reconfigure the communication paths within the various traffic routes of the network as well as to control the alarm systems within the exchanges of the network in order to fine tune the alleviation of congestion conditions within the network.

ATM System Concepts

As discussed above, numerous changes are currently taking place within the public telecommunications transport networks being implemented. Operators of public telecommunications networks have long sought to deploy a single type of technology to handle the transport and switching of all types of telecommunications services within a common infrastructure. One such technology is Asynchronous Transfer Mode (ATM) technology.

ATM is currently being implemented in an attempt to satisfy these needs by creating a bearer telecommunications network which has substantial "bandwidth granularity" and which is capable of coping with very high bandwidth connections. The term "bandwidth granularity" refers to a characteristic of a network that can handle calls whose bandwidth requirements continually vary over a wide range during the duration of a call.

The use of ATM technology in the public telecommunications network provides the capabilities of common switching and transport for related services, increased bandwidth granularity, support of variable-bit-rate services, and support of multimedia services. Because of these features, ATM has been chosen by the International Telegraph and Telephone Consultative Committee (CCITT) as the core technology for broadband ISDN (B-ISDN) services. This is despite the disadvantages of ATM, including transit delays for low speed isochronous services, added complexity within a network, and the introduction of new performance parameters (such as cell-loss and congestion), with which the system of the present invention deals, as will be further set forth below.

An ATM network may be implemented using either plesiochronous digital hierarchy (PDH) or synchronous digital hierarchy (SDH), or both. Moreover, pure ATM may be used as the bearer for a network whenever the limitations arising from multiple conversions between ATM and STM (synchronous transfer mode) and the resultant performance degradations can be dealt with.

Figure 2:
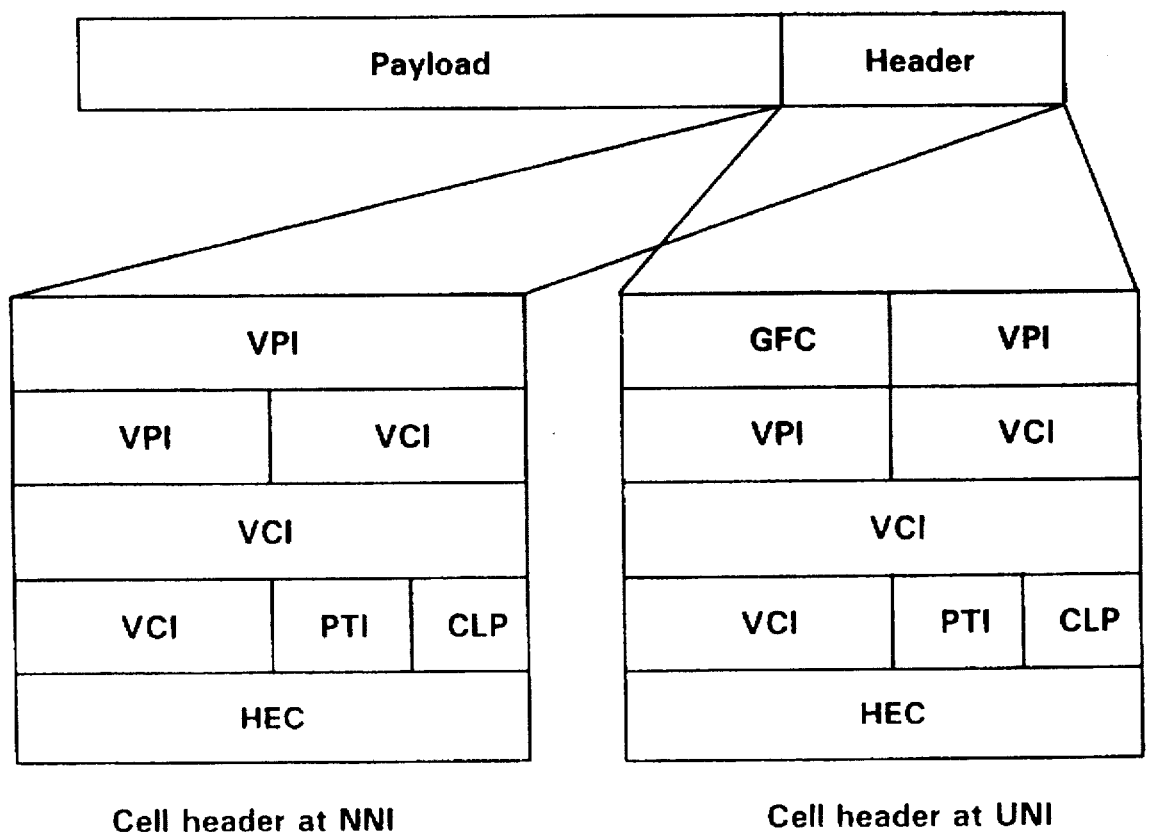
FIG. 2 is a block diagram illustrating an exemplary ATM cell structure.

The ATM cell structure shown in FIG. 2 is at the heart of ATM technology. An ATM cell has a fixed length of 50 bytes, or octets, divided into a five octet header and a forty-eight octet information field (also known as the payload). The ATM cell header is structured as a number field and one of its main functions is to assist in routing the ATM cell from the point of origin to the point of destination through one or more switching nodes. The information held in each ATM cell is kept relatively small in order to reduce the size of the internal buffers in the switching nodes and to limit the queuing delays in those buffers. ATM operates in a connection-oriented mode. This is important from a modeling viewpoint since it makes it possible to use the results of well-established circuit-switched mathematical models to optimize the allocation and control of network resources.

The principal function of the ATM cell header is the identification of the virtual connection. Routing information within the ATM cell is contained within two fields: a virtual path identifier (VPI), which determines which virtual path the ATM cell belongs to, and a virtual channel identifier (VCI), which determines which virtual channel in the virtual path the cell belongs to.

A virtual channel is a dynamically allocable end-to-end connection. Optical transmission links are capable of transporting hundreds of megabits per second, whereas virtual channels may fill only a few kilobits per second of a link. Thus, a large number of simultaneous virtual channels can be supported on a single transmission link.

A virtual path, on the other hand, is a semi-permanent connection between endpoints. Each of virtual paths can transport a large number of simultaneously-connected virtual channels. Since a large group of virtual channels are handled and switched together as a single unit, the total processing requirements of a virtual path are less than that of a virtual circuit, and consequently there is faster processing per (virtual) circuit, resulting in a significantly more efficient use of network resources. The network management of virtual paths is relatively simple and efficient.

As illustrated in FIG. 2, the ATM cell header is slightly different at the user-network interface (UNI) compared with the network-node interface (NNI). The UNI contains four bits for generic flow control (GFC) and is used to ensure fair and efficient use of available capacity between a terminal and the network. A payload type indicator (PTI) field is used to indicate whether an ATM cell contains user information or special network information, e.g., for maintenance purposes. A cell loss priority (CLP) field encodes a two-level priority and is used when it becomes necessary to discard cells because of network conditions. The header information is protected by a check sum contained within the header error control (HEC) field.

The use of ATM cells permits the information transfer rate to adapt to the actual service requirements. Depending upon the capacity required, the number of cells per unit of time can be increased up to the transmission bit-rate limit of the physical medium used to carry the data. In addition to data cells there are also cells for signaling and maintenance and idle cells. Signaling cells are used between an end user in the network, or between nodes in the network and their function is to set up a service, e.g., a connection. Maintenance cells provide supervision of the ATM layer while idle cells are used to fill the transmission capacity up to the rate of the transmission medium.

Figure 3:
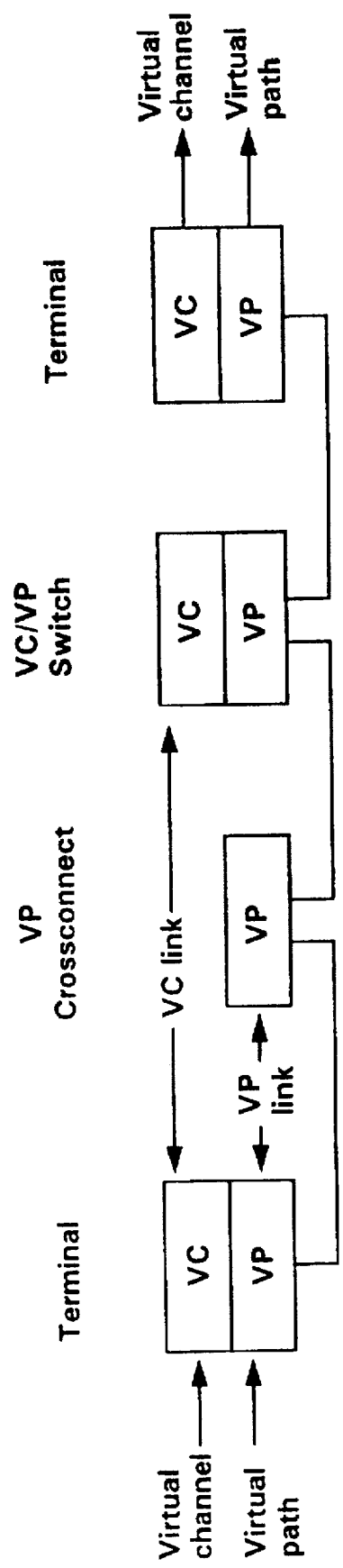
FIG. 3 is a block diagram illustrating a number of interconnected virtual paths and virtual channels within an ATM network.

Referring to FIG. 3, there is shown a block diagram illustrating the switching and cross-connection of virtual channels and virtual paths within an ATM link. From the viewpoint of a switch designer, "VP switching" refers to the switching of an ATM cell using only the upper part of the identifier field, that is, the shorter field (VPI). In contrast, in "VP/VC switching" the entire identifier field (i.e. both the VPI and the VCI) are used to switch an ATM cell.

A VP/VC path consists of a plurality of interconnected VP/VC lengths. Switching and cross-connection can be performed at either the VP or the VC level. The virtual path identifier (VPI) and the virtual channel identifier (VCI) define a two-tier handling and routing structure within the ATM circuitry. From the network architectural standpoint, a virtual path (VP) is a bundle of individual connections, a type of "highway" in the route map of an ATM network. One important task in network management is to allocate the right amount of transmission capacity to each such highway (i.e., a virtual path) in order to optimize network performance. This optimization task is the objective of bandwidth management or virtual path dimensioning techniques.

Figure 4:
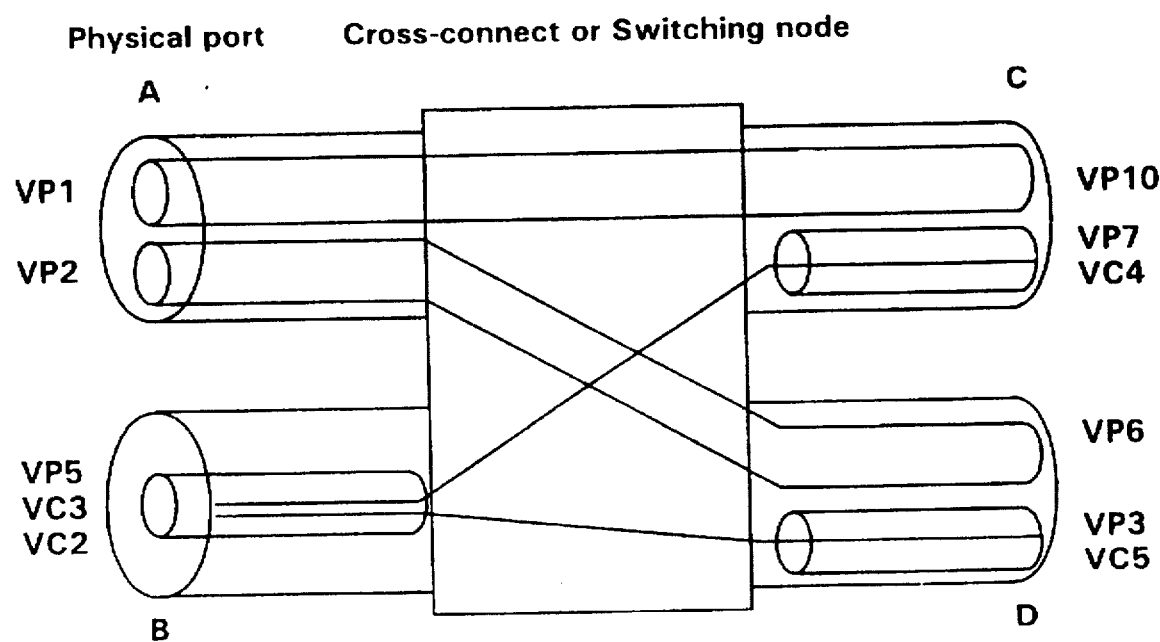
FIG. 4 is a block diagram illustrating the cross-connection and switching of virtual paths and virtual channels within an ATM network.

FIG. 4 illustrates the concepts of virtual path and virtual channel cross-connection and switching. The virtual path identifier (VPI) and virtual channel identifier (VCI) values are only valid for a specific link. In each cross-connect or switch, new VPI/VCI values are assigned to the cell with the combination of physical port and VPI/VCI values providing the identification for the ATM cell. The routing of an exemplary ATM cell is then performed, with the aid of translation tables such as that illustrated in TABLE 1.

TABLE 1

| CONNECTED - FROM PORT | VPI | VCI | CONNECTED - TO PORT | VPI | VCI |
|---|---|---|---|---|---|
| A | 1 | — | C | 10 | — |
| A | 2 | — | D | 6 | — |
| B | 5 | 3 | C | 7 | 4 |
| B | 5 | 2 | D | 3 | 5 |

An ATM cell is the basic multiplexing unit within an ATM transport system, with each cell or information unit containing its own connection and routing information. This feature enables direct multiplexing or demultiplexing of service channels wherein each channel may carry different bit-rates. Each ATM cell is identified and routed by information contained in the header within the virtual path identifier (VPI) and virtual channel identifier (VCI) fields. As mentioned above, a virtual path (VP) is a bundle of multiplexed circuits between two termination points, e.g., switching systems, Local Area Network (LAN) gateways, or private network gateways. A VP provides a direct logical link between virtual path terminations, with the VPI value identifying the particular virtual path.

As also mentioned above, the virtual path concept used within ATM technology allows multiple virtual channels (VCs) to be handled as a single unit. Virtual channels with common properties, such as those with the same quality of service (QoS), can be grouped together in bundles that can be transported, processed and managed as one unit. This flexible bundling simplifies the operation and maintenance of an ATM system.

Both virtual paths and virtual channels can be used to provide semi-permanent paths within the ATM network. Routes are established and released from an operation support system by the setting of "path connect tables" in the cross-connect equipment or in the multiplexers along a path. Virtual channels can also be used for on-demand switching with connections being established by signaling either between a user and the network or within the network.

One important characteristic of ATM technology relates to its protocol architecture and is built around the so-called "core-and-edge" principle. The protocol functions specific to the information type being transported, such as retransmissions, flow control, and delay equalization, are performed in terminals at the "edges" of the ATM network. This leaves an efficient, service-independent "core" network, that only includes simple cell-transport and switching functions. Within the ATM nodes in this "core", there is no error checking of the information field nor is there any flow control. The cell information is simply read, the HEC is then used to correct single-bit errors that might affect the address and the cell is then switched towards its destination.

Figure 5:
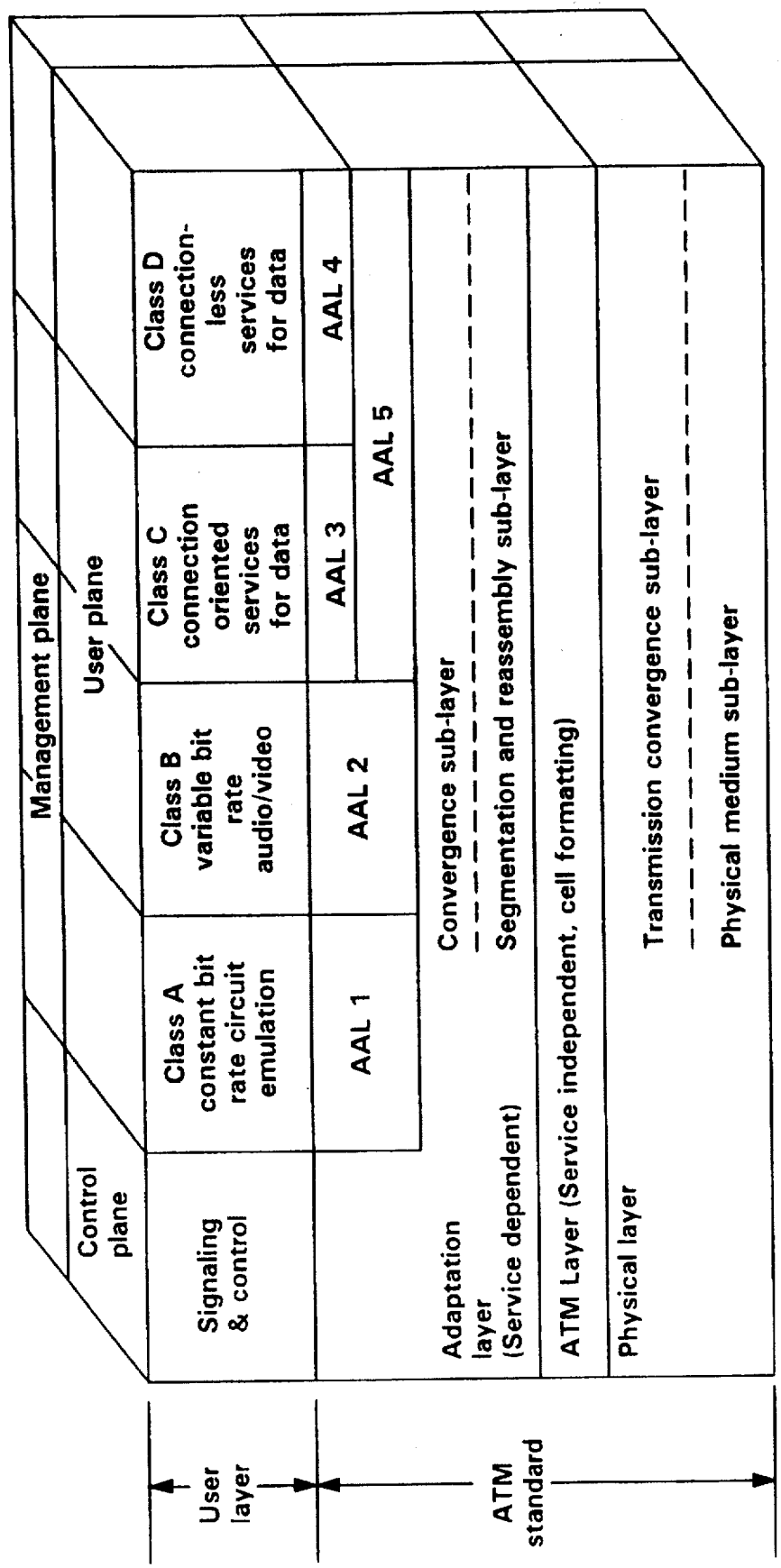
FIG. 5 is a diagram illustrating the CCITT B-ISDN reference model showing the varieties of service classes supported by the standard and the layers of the standard.

An ATM adaptation layer (AAL) is used at the "edge" of the network to enhance the services provided. As shown in FIG. 5, the CCITT reference model for B-ISDN services envisages that the AAL include service dependent functions. As depicted in FIG. 5, there are three layers in the ATM standard. The first layer is the physical layer defining the physical interfaces and framing protocols. The second ATM layer is independent of the physical medium chosen and defines cell structure, provides multiplexing and demultiplexing and VPI/VCI translation to control the flow of cells within the logical network. The third layer is the AAL which provides the important adaptation between the service and the ATM layer thereby allowing service-independent ATM transport. The AAL performs mapping between the original service format and the information field of an ATM cell. Exemplary functions provided by the AAL include variable-length packet delineation, sequence numbering, clock recovery and performance monitoring.

Deployment of ATM in Telecommunications Networks

One use of ATM technology can be used within customer premises to support high-speed data communications in and between customer local area networks. In addition, ATM can be used as an infrastructural resource that is common to all services within a customer premises network, including voice and video communications, data transfers and multimedia applications.

An exemplary service for which ATM nodes are introduced into a public telecommunications network is to provide virtual leased line (VLL) service. VLL service is based upon a virtual path concept and allows line capacity to be directly tailored to customer needs and easily changed without modifying the interface structure. A large number of logical connections can be offered to a user through user-network interfaces (UNIs).

In addition, a custom tailored quality of service can also be offered to a customers matching the needs of the user. Thus, multiple classes of service, quality of service classes and performance parameters can be selected. For example, voice services require low transmission delays but can tolerate high bit-errors, while data communications, on the other hand, are more tolerant of network delays but are sensitive to bit-errors. Thus, the quality of service level of a particular application can be contractually agreed to between a service provider and a customer and audited manually or automatically to ensure compliance.

Figure 6:
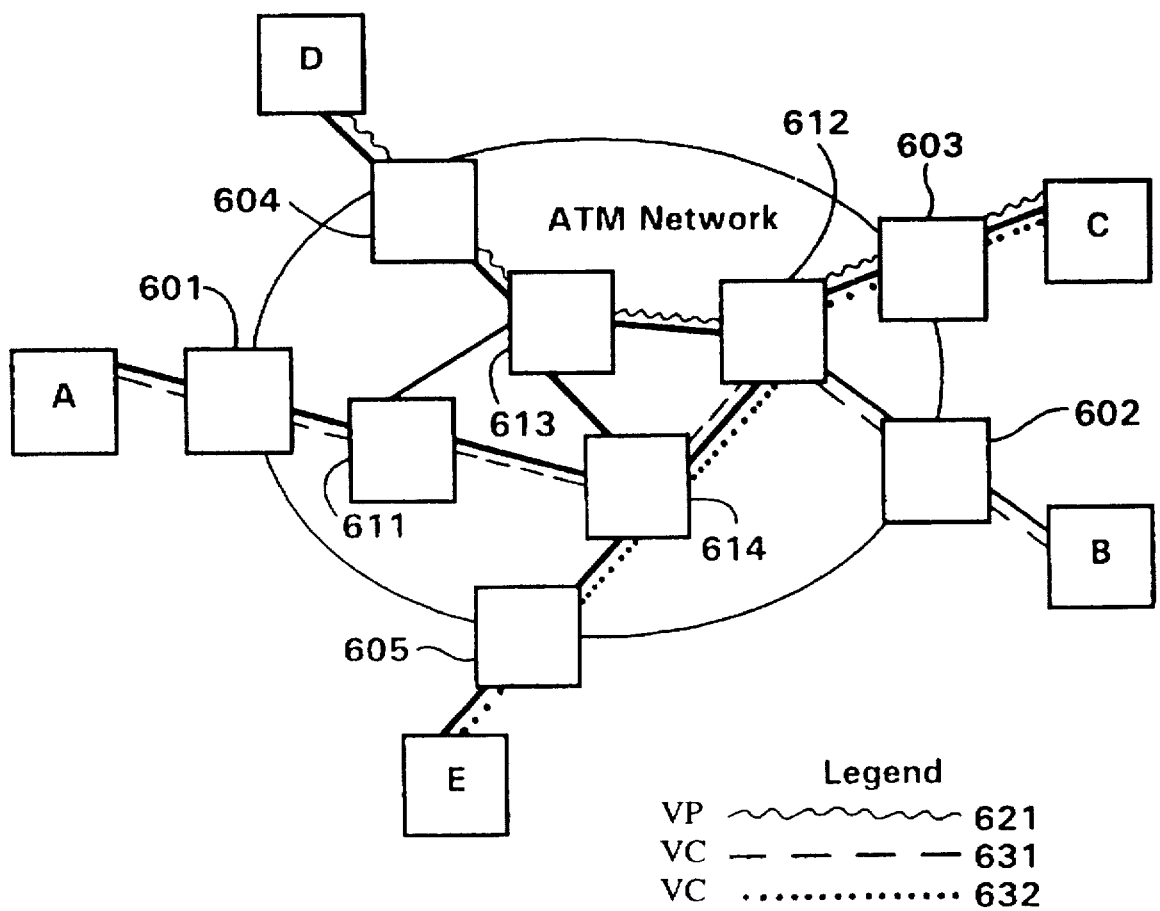
FIG. 6 is a diagram showing an illustrative ATM network providing virtual leased line (VLL) service.

FIG. 6 shows an exemplary virtual channel based VLL service implemented within a ATM network. Network terminals A to E are each coupled through flow enforcement nodes 601 to 605, respectively, to ATM cross-connect nodes 611 to 614. The ATM network consist of a plurality of ATM cross-connects 611 to 614 which can provide routing both at the virtual path as well as at the virtual channel level. The flow enforcement functions 601 to 605 are located at the edge of the ATM network to protect the network against potential overloads. This function ensures that no connection violates the conditions that were agreed-to when the connections are set up.

Additional services can be implemented by adding services to one or more of the cross-connect nodes 611 to 614. Within the network of FIG. 6, an exemplary virtual path is illustrated by the wavy line 621 between terminal C and D. A first virtual connection between terminals A and B is illustrated by the dashed line 631 while a second virtual connection is illustrated by the dotted line 632 between terminals C and E.

In addition to the virtual leased line network shown in FIG. 6, other services, such as SMDS/CBDS and frame relay, can easily be added depending upon demand by connecting servers to the ATM nodes within the network. In residential areas, ATM technology can be used to provide new and enhanced entertainment services such as on-demand video to the end user. The flexibility of an ATM network makes it possible to simultaneously support a multitude of services, such as long distance education, home shopping, and games.

Figure 7:
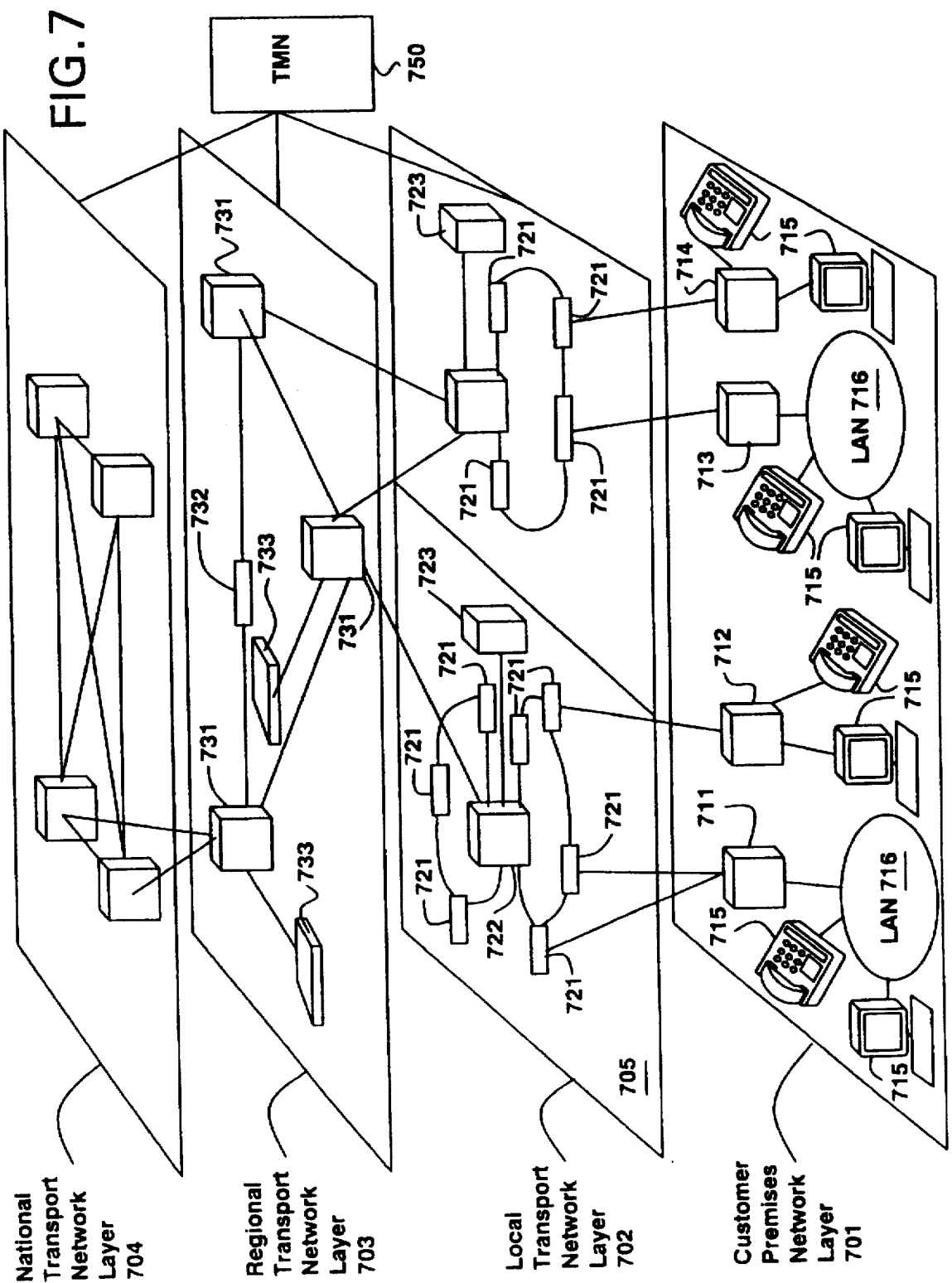
FIG. 7 is a diagram illustrating a multi-layered SDH-based transport network which includes ATM cross-connects.

FIG. 7 illustrates an ATM network that has been overlaid upon a SDH-based layered transport network. The layers include a customer premises network layer 701, a local transport network layer 702, a regional transport network layer 703 and a national transport network layer 704. A plurality of ATM business network nodes 711 to 714 control the flow of data from the customer premises terminals 715 and LANs 716 into respective ones of a plurality of add-drop multiplexers (ADM) 721 serving SDH cross-connect nodes 722 within the local transport network 705. The local cross-connect nodes 722 are in turn coupled through regional cross-connect nodes 731 in the regional transport network, two of which are coupled by add-drop multiplexers 732. Within the local transport network layer 702, a pair of ATM access nodes 723, and SDH rings, comprising the add-drop multiplexers 721, serve the cross-connects 722 and are used for subscriber access with a capacity of up to a full 155 megabits per second, the standardized STM-1 access rate for B-ISDN services.

Existing traffic such as the Plain Old Telephone Service (POTS) can also be carried on this ring network, with remote multiplexers and other access nodes providing the final local-loop connection. The ATM access nodes 723 are shared for access to different services from one location and can include both voice and data using different VP/VCs. In the ATM access nodes 723, ATM traffic is concentrated to make more efficient use of the transport capacity.

The size of an ATM access node can vary, depending upon the capacity required, from a small multiplexer to a large cross-connect. In the regional transport layer 703, ATM cross-connects 733 are used to route traffic between local areas. The use of ATM technology is not visible in the national transport network layer 704, illustrated in FIG. 7. In an ATM overlay network, such as the one illustrated in FIG. 7, services such as frame relay and SMDS/CBDS can be easily added. Functionality for B-ISDN can also be added to both access and regional nodes by adding appropriate software and hardware. As also illustrated in FIG. 7, a network management system 750, such as one operating in accordance with the TMN standard of the CCITT can be implemented to provide the necessary network management functionality to both the SDH and ATM elements of the network.

The management of the ATM network by subsystem 750 may be implemented in accordance with the telecommunications management and operations support (TMOS) family of network management systems provided by Telefonaktiebolaget LM Ericsson, the assignee of the present application. Such network management may include various functionalities such as routing algorithms and congestion control.

High-Speed Optical Switching

Figure 8:
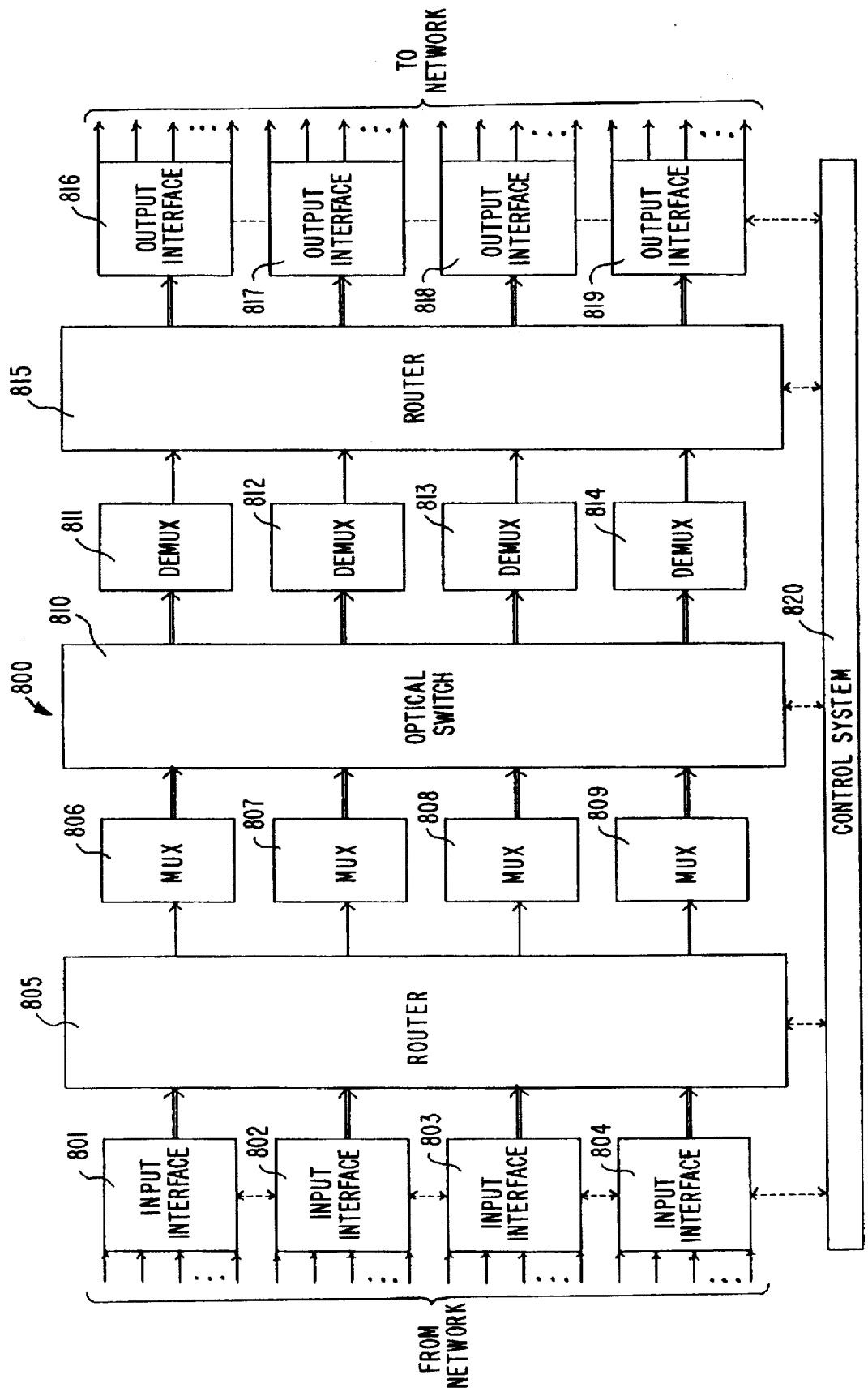
FIG. 8 is a high-level block diagram of one embodiment of a high-speed optical switching system.

Referring next to FIG. 8, there is shown a high-level block diagram of a high-speed ATM switching system 800 constructed in accordance with one embodiment of the present invention for switching data, such as ATM cells, or data packets of fixed size. It should be noted that, for purposes of simplification, various control and clocking signals and associated circuit blocks that would be readily apparent to those skilled in the art have been intentionally omitted from this and other figures in this application.

As discussed above, each ATM cell is typically fifty-three octets long and consists of a five octet header which contains a virtual channel identifier (VCI) field, a priority field and other information not relevant to the present invention, followed by all of the remaining bits. These bits, which are typically referred to as "data," are the "payload" or user data bits and are merely transported unchanged through the switching system of the present invention.

The VCI identifies a specific virtual channel that is to transport the cell and which extends between one node within an ATM network, such as a B-ISDN network, to the next successive node. The specific channel identified by the VCI, and hence its corresponding VCI designation, varies from one node to the next as the cell as transported through successive network nodes. The value of the priority field is determined during call set-up negotiations and, as a result, it is appropriately generated by the user terminal that initially produced the cell being switched. This value specifies the priority, relative to that associated with other cells being handled, at which the cell is to be transported through the network. The value of the priority field remains constant as the cell propagates through the various nodes of the network.

It is important to note at this point that the reference to ATM cells is for illustrative purposes only. One skilled in the art would appreciate that the switch of the present invention will work equally well with other electronic data structures. The data structures should preferably be in the form of packets of the same size and which have headers that can be translated into a switch output port designation number or address.

As shown in FIG. 8, the ATM switching system 800 includes a plurality of input interface modules 801 to 804 each of which receive a plurality of input data lines from the network, e.g., 128 data lines for each input interface. The outputs of each of the input interface circuits 801 to 804 are connected to the inputs of a routing circuit 805, the output of which is connected to the inputs of a plurality of multiplexers 806 to 809. The outputs of the various multiplexers 806 to 809 are connected to the inputs of an optical switch 810.

Similarly, the outputs of the optical switch 810 are coupled through a plurality of demultiplexers 811 to 814 to a router 815 and thence to a plurality of output interface circuits 816 to 819. The outputs of each of the output interface circuits 816 to 819 are connected to multiple paths coupled to the network. A control system 820 is connected to the routers 805 and 815, the optical switch 810 and the input and output interfaces 801 to 804 and 816 to 819 respectively to coordinate the activities thereof. User terminals or exchanges that are well known in the art are connected to the far ends of each of the user lines within the network to supply and receive ATM cells in bit-serial fashion.

Each of the input interface circuits 801 to 804 may incorporate a number of network functions including the termination of a plurality of associated data lines, whether emanating directly from a user or from the network; protecting the network by maintaining incoming data in a form suitable for switching and transport through the network; limiting the data rate or channel bandwidth to that for which the user has specifically contracted; concentrating and sorting packets as necessary; and performing cell header translations for each incoming ATM cell.

Each ATM cell typically consists of a five octet header segment followed by a forty-eight octet payload segment.

The five octet header segment typically contains routing information relating to the destination of that ATM cell. However, if an ATM cell can be identifiably related to a connection that has already been set up, then the routing information contained in the header of the ATM cell will sometimes be redundant. In such a situation, the routing header that is part of each ATM cell prior to the entry of that cell into the switching system 800 can be stripped off subsequently from the ATM cell prior to the cell being forwarded to the output virtual channel of the network. In one embodiment, the routing header of an ATM cell contains one or more fields specifying the physical address of a specific output port to which that ATM cell is to be routed. Within the switch 800, each ATM cell can be treated as data that is to be directed to a particular destination address.

Each of the input interface circuits 801 to 804 communicates with the switching system 800 by providing incoming cells at a specified data rate. Each of the output interface circuits 816 to 819 receive outgoing cells at approximately the same data rate. Each of the input and output interface circuits are also connected to the switch control system 820 and are appropriately monitored and controlled by that unit. Special purpose inputs and outputs (not specifically shown) are provided to conduct packet tests and switch operations and maintenance connections to the switch 800 under the control of the control system 820.

Continuing to refer to FIG. 8, the switch control system 820 performs a number of essential control tests and administrative functions for the switch 800. To perform these functions effectively, the control system 820 is designed to bidirectionally communicate with and control each of the units that comprise the switch 800 including the input and output interface modules 801 to 804 and 816 to 819 respectively, incoming and outgoing routers 805 and 815 respectively, and the optical switch 810.

For example, switch control system 820 processes incoming calls by establishing and taking down appropriate virtual connections through the switch 800 for each such call, selecting routes through routers 805 and 815 for incoming and outgoing ATM cells that constitute each call handled by the switch 800, and determining the specific header translation that is to occur within each of the input and output interface modules.

In addition, the control system 820 also performs network maintenance and administrative functions such as locating and repairing problems within the network and maintaining data on the performance and status of the switch 800 and its interactions with the network. Switch control system 820 also distributes traffic between the switch 800 and other parts of the network in order to use existing network resources efficiently. In addition, the control system 820 responds to various user inquiries as well as to user requests for changes in service.

The control system 820 performs periodic routine diagnostic tests of the entire switch 800. In particular, the control system executes a sequence of diagnostic operations from time to time to apply pre-defined ATM test cells and test the resulting operation, on an end-to-end basis, of the entire switch 800 as well as to test the operation of each of the component blocks described above within the switch 800 and the optical switch 810.

Through such diagnostics, the switch control system 820 is able to detect failure conditions and in the event of such a failure, to institute appropriate corrective actions to counteract such failures. In the preferred embodiment, the switch control system 820 may comprise any one of the many well-known relatively large programmed computers and peripheral and memory devices associated therewith.

With continued reference to FIG. 8, the routers 805 and 815 are computer controlled switching matrices that provide circuit-switched connections between the input interface modules 801 to 804 and the multiplexers 806 to 809. The connections through the routers 805 and 810 are established by the control system 820 and are dynamically variable as to be able to handle a failure within the optical switch 810, or within one of the input or output interface circuit 801 to 804 and 816 to 818, respectively.

This flexibility provides a more fault-tolerant switching operation. High-speed trunks, connected through appropriate specialized interface circuits, link the switch 800 to other switching nodes situated within a ISDN ATM network. Since these trunks are not particularly relevant to the present invention, they are not shown in FIG. 8.

In the optical switching system of the present invention, incoming electronically encoded temporal-domain signals, e.g., ATM cells, are transformed into one or more optical patterns in the spatial-domain. For example, the payload information of an ATM cell is transformed into a first input image pattern and the address information of the same ATM cell is transformed into a second address input image pattern. Depending upon the type of switching, virtual path or virtual channel, that is performed within switch 800, different parts of an ATM cell may be transformed into the first and second images. In the case of VP switching, the VC address is interpreted as part of the payload information and may thus be transformed to the first image representation.

An additional aspect of the switching system of the present invention is that the optical switch 810 is spatially compact (since it is not a distributed switch) and a manifestation of the optical image information is realized in free space within the switch itself and requires no transmission channel. It should be noted that this switching system can be reconfigured to operate in distributed mode wherein the input and the output stages of the switch are not in spatial proximity to each other. However, a distributed arrangement such as this would need a multi-core fibre-optic cable to link the various stages of such a switching system.

The electronically encoded signal represented in time-domain, i.e., the ATM cell contents, is transformed into two spatial patterns. The payload information of an ATM cell is transformed into a first data input image pattern and the relevant address information in the ATM cell is transformed into a second address image pattern. The first data input image containing payload information is combined with the address image pattern by a spatial optical encoder.

Since there are many input ports to the switch 800, the information coming into each input port is coded in analogous ways as described above with different destination addresses being assigned different address image patterns. Moreover, each of the address image patterns are orthogonal to all the rest. This requirement allows all encoded images to be spatially superimposed, i.e., summed or multiplexed into a single image without affecting the information contained therein. The optical multiplexing function is performed by an optical image coupler and the image output produced is a spatially superimposed encoded image that can be considered as a single combined spatial pattern.

An identical copy of the combined spatial image pattern, which constitutes a stun of each of the encoded image patterns, is sent to each of the output spatial decoders of switch 810. In each decoder, the combined spatial image pattern is decoded using the address image pattern corresponding to the address of that output port. By utilizing the orthogonality property of the address image patterns and by thresholding the optical image in an image regenerator, the image with matching address patterns can be recovered. This image can then be transformed from the spatial-domain representation back to the time-domain representation used in ATM cells.

Figure 9:
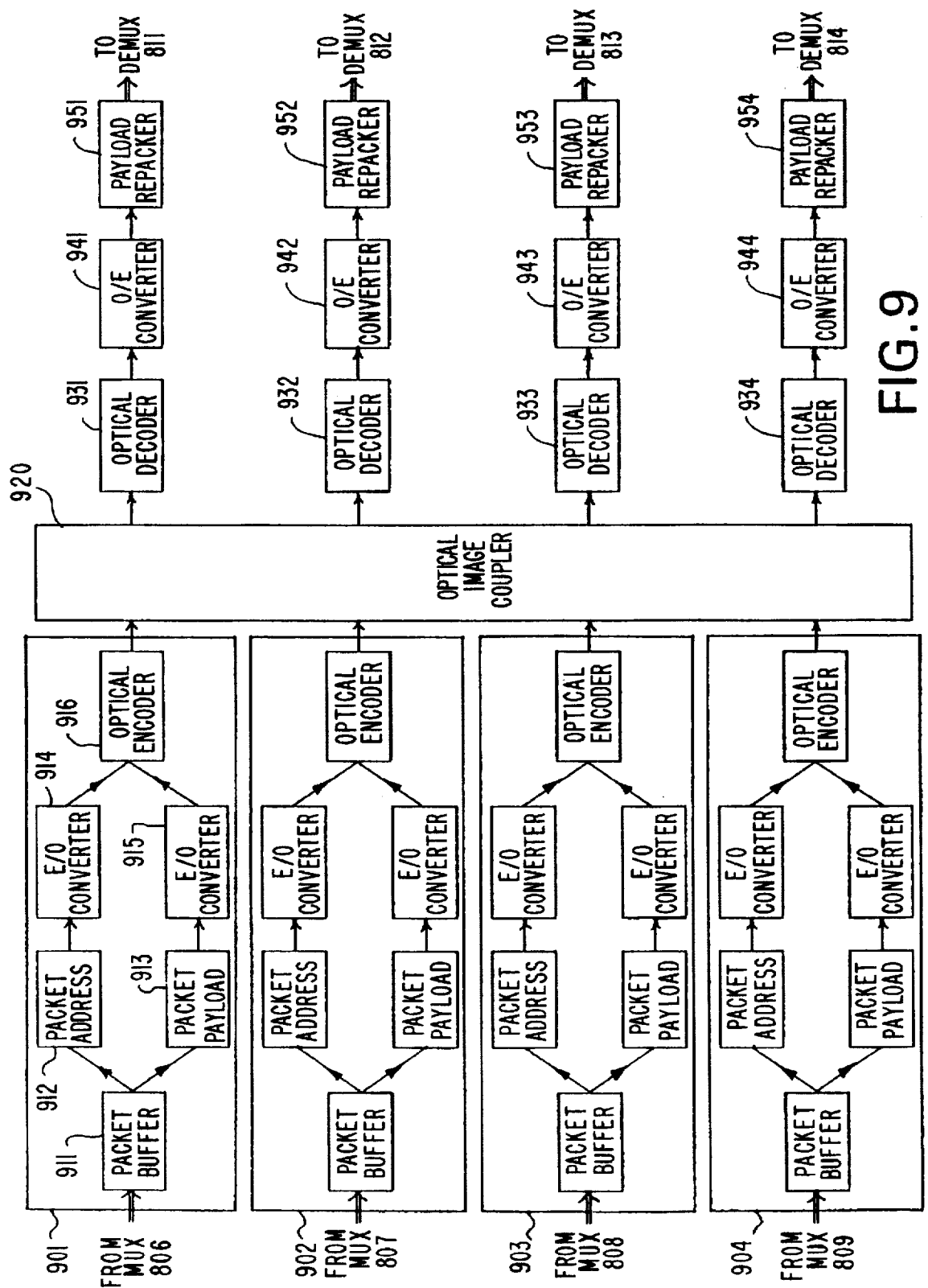
FIG. 9 is an detailed block diagram of the optical switch depicted in FIG. 8.

Referring next to FIG. 9, there is shown an illustrative block diagram of one embodiment of the optical switch 810 depicted in FIG. 8. The optical switch 810 shown in FIG. 8 further comprises a plurality of input ports 901 to 904, each of which comprise a packet buffer 911 for receiving ATM data packets coming from the multiplexers 806 to 809 shown in FIG. 8.

Incoming ATM cells are first received and stored in packet buffers 911. The address portion of each packet is stripped off at 912, and the payload portion of the ATM packet is formatted at 913. Thereafter, the time-domain packet address data is converted into a space-domain image in an electronic/optical (E/O) converter 914 while the payload time-domain representation is converted to a space-domain image in a similar E/O converter 915. Each E/O converter contains a table of address image patterns corresponding to the range of possible destination addresses.

Figure 10:
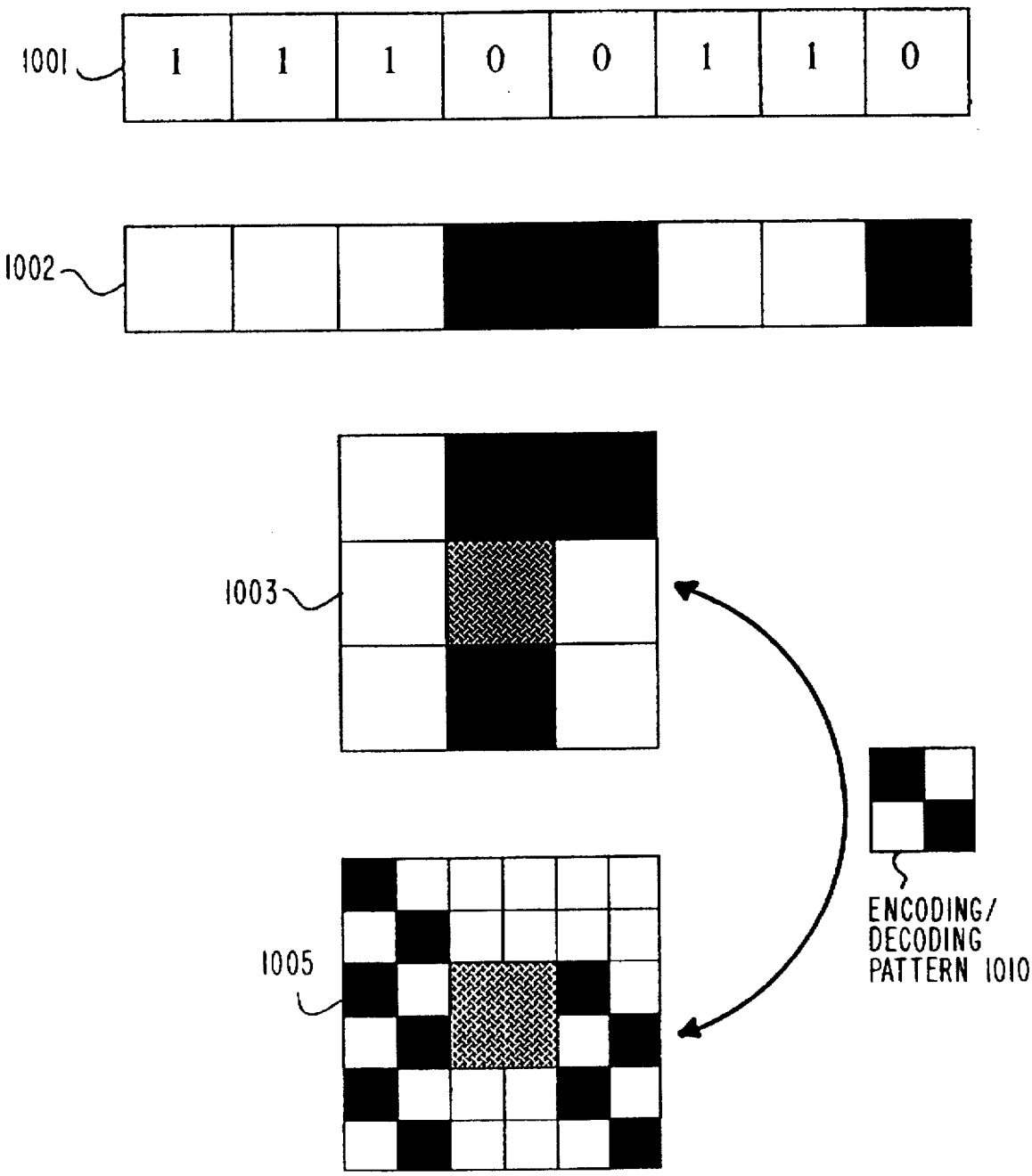
FIG. 10 shows an illustrative example of the modulation and demodulation processes for the simple case of an eight-bit payload segment being modulated by a four-bit address segment.
Figure 11A:
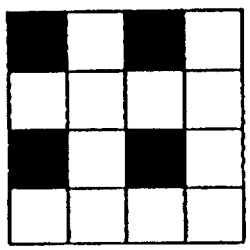
FIG. 11 shows four symmetric non-overlapping encoding patterns that can be used to reversibly modulate the data to be switched towards four distinct destinations.
Figure 11B:
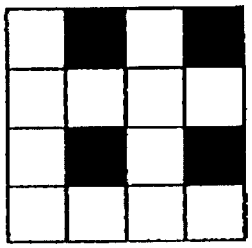
Figure 11C:
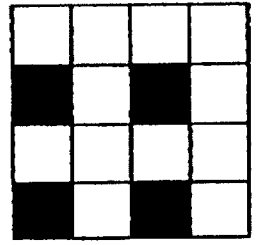
Figure 11D:
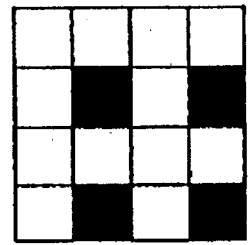

An optical packet encoder 916 in each of input ports 901 to 904 combines the address image from the E/O converter 914 and the data image from the E/O converter 915 into a unified optical image representation by modulating the data image with the address image. The modulation and demodulation processes are illustrated in FIG. 10 for the simple case of an eight-bit payload segment being modulated by a four-bit address segment.

An eight-bit payload word of $11100110_2$ shown in digital form at 1001, can be converted from binary digital representation to binary optical representation. In one embodiment of the present invention, the conversion from electronic to optical form is performed by representing every non-zero bit with an illuminated (i.e. a white) square and representing every bit containing a zero value with an unilluminated (i.e. a black) square, as shown at 1002.

The optical representation of the eight-bit payload data is then arranged into a suitable geometrical pattern that is optimized for transmission as shown at 1003. In the exemplary arrangement illustrated in FIG. 10, the eight squares of the optically-encoded payload segment are arranged around the periphery of a three-by-three grid. As explained later in this application, an axially-symmetric arrangement of the payload segment is considered desirable for practical reasons.

The non-zero peripheral squares of the three-by-three grid shown at 1003 are next modulated using the encoding/decoding pattern 1010 to yield the modulated optically-encoded pattern illustrated at 1005. As can be seen from FIG. 10, the black squares of 1003 are not modulated using the encoding/decoding pattern 1010. As explained in greater length later in this application, the encoding/decoding pattern 1010 needs to satisfy a number of conditions, including the fact that each pattern has to correspond to a unique destination address.

The outputs of the optical encoders 916 in each of the input ports 901 to 904 are then multiplexed using an optical image coupler 920 and broadcast to a plurality of target sensors, each of which corresponds to a specific destination address. The broadcast optical signal received by optical decoders 931 to 934 are then demodulated by a process that is in reverse order to the modulation process detailed above. The optical representation regenerated by one or more of the decoders 931 to 934 are then reconverted into electronic form by Optical/Electronic converters 941 to 944. The switched payload received at each destination sensor is then repackaged in the payload repackers 951 to 954, and forwarded to the corresponding demultiplexers 811 to 814.

Similar processing of other ATM packets is performed in the circuitry of input ports 902 to 904 and all of the unified optical images from the four separate data input ports shown in FIG. 9 are superposed to create a single composite image in the optical image coupler 920. The single composite image from the image coupler 920 is projected on to the inputs of a set of optical packet decoders 931 to 934.

Each of the decoders 931 to 934 contain the address image pattern corresponding to its address and uses this address image pattern to decode the optical signal received from the optical image coupler 920. Since the optically coded data streams are orthogonal to each other, all of the data streams can be simultaneously switched in parallel. This method of operation allows for extremely fast switching, potentially in the range of ten terabits per second or greater. The optical image coupler 920 may comprise well known devices such as optical star-couplers, either individually or in the form of an array.

Thus, the encoded image corresponding to each ATM data packet is constructively projected in free space to every optical spatial decoder in the output port of the switch and decoded using the corresponding address image pattern associated with that destination data port.

Non-interfering Optical Encoding Patterns

An understanding of the optical encoding and decoding techniques envisaged in this invention can be obtained by a reference to the four patterns illustrated in FIG. 11. For convenience of description, the four patterns shown in FIG. 11 will be referred to hereafter as Pattern A, Pattern B, Pattern C and Pattern D, and these are identified by the legends FIG. 11A, FIG. 11B, FIG. 11C and FIG. 11D in FIG. 11.

Assume that the four optical encoders shown in FIG. 9 are each capable of encoding each bit of information into any of the four optical patterns shown in FIG. 11. In this manner, the optical encoders can specify the destination of each bit of information. For example, the optical encoders can use Pattern A to route data through an optical decoder towards demultiplexer 811, or use Pattern B to route data towards the demultiplexer 812, or use Pattern C to route data towards the demultiplexer 813, or use Pattern D to route data towards the demultiplexer 814.

It is assumed that a binary data stream, composed of a stream of zeros and ones, will be encoded using patterns A, B, C or D, depending on the destination of each bit, with the encoding pattern being used if the value of a particular bit is one and with a null or blank pattern being used if the value of the bit is zero. As described earlier, the outputs of the four optical encoders shown in FIG. 9 are superimposed and broadcast to the four optical decoders of FIG. 9 through the optical image coupler 920.

FIG. 12 shows the effects of superimposing patterns A, B, C and D. It can be shown that there are sixteen different patterns that can be created by the superposition of various combinations of four patterns. These sixteen different patterns are listed in TABLE 2 below.

TABLE 2

| Pattern Number | Cell Contents |
|---|---|
| 1 | A |
| 2 | B |
| 3 | C |
| 4 | D |

TABLE 2-continued

| Pattern Number | Cell Contents |
|---|---|
| 5 | — |
| 6 | A + B + C + D |
| 7 | A + D |
| 8 | B + C |
| 9 | A + B |
| 10 | C + D |
| 11 | A + C |
| 12 | B + D |
| 13 | B + C + D |
| 14 | A + C + D |
| 15 | A + B + D |
| 16 | A + B + C |

Patterns 1 to 4 are the same as those shown in FIGS. 11A to 11D. Patterns 5 to 16 are illustrated in FIGS. 12A to 12L. As can be seen from comparison of the sixteen patterns shown in FIGS. 11 and 12, no two of the sixteen patterns are identical. This shows that any combination of the four patterns A, B, C, and D can be decomposed or decoded into its component basic patterns.

It is not necessary that the four patterns used for encoding be symmetric as shown in FIG. 11. Such patterns can also be asymmetric as shown in FIG. 13. Referring again, to the four patterns shown in FIG. 13 as patterns A, B, C and D, the superposition of various combinations of these four patterns is illustrated in FIGS. 13 and 14. The sixteen combinations that are possible with the four Patterns A, B, C and D, are identical to those listed in TABLE 2. Patterns 1 to 4 of TABLE 2 are shown in FIGS. 13A to 13D. Patterns 5 to 16 of TABLE 2 are shown in FIGS. 14A to 14L. As can be seen, no two of the sixteen patterns shown in FIGS. 13 and 14 are identical. Thus we can see that the use of asymmetric patterns can also permit the perfect decoding of superposed image patterns. The advantages of asymmetric basic patterns over symmetric ones are discussed further on.

It is not necessary for the basic patterns that are used to be non-overlapping. FIG. 15 shows four patterns A, B, C and D that partially overlap each other. The effects of superposing various combinations of patterns A, B, C and D, shown in FIG. 15 can be seen in the sixteen patterns shown in FIGS. 15 and 16. As before, the Patterns 1 to 4 of TABLE 2 are illustrated in FIGS. 15A to 15D, and Patterns 5 to 16 of TABLE 2 are illustrated in FIGS. 16A to 16L. As before, it can be seen that no two of the sixteen patterns shown in FIGS. 15 and 16 are identical. Consequently, the decomposition of any of the sixteen patterns back into the component basic patterns A, B, C and/or D is thus technically feasible.

Figure 12A:
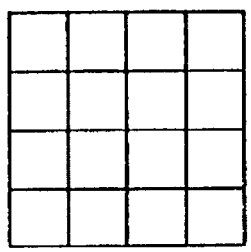
FIG. 12 shows twelve of the sixteen optical patterns that result from the superposition of various combinations of the four basic encoding patterns shown in FIG. 11.
Figure 12B:
Figure 12C:
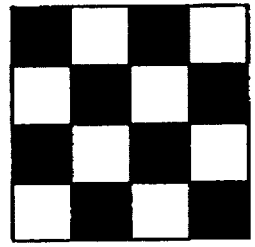
Figure 12D:
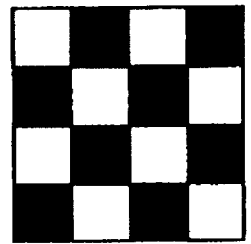
Figure 12E:
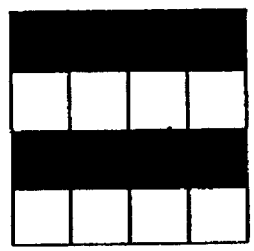
Figure 12F:
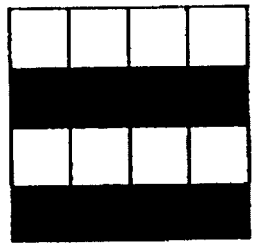
Figure 12G:
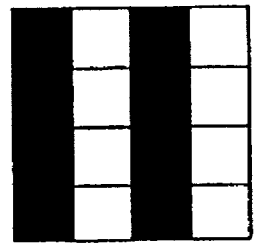
Figure 12H:
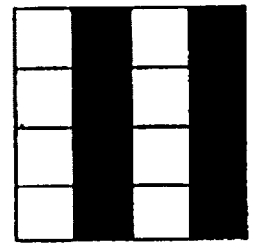
Figure 12I:
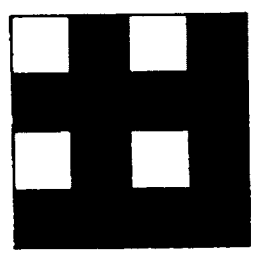
Figure 12J:
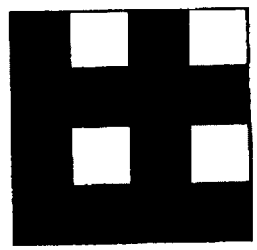
Figure 12K:
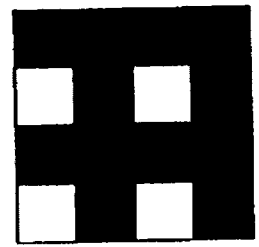
Figure 12L:
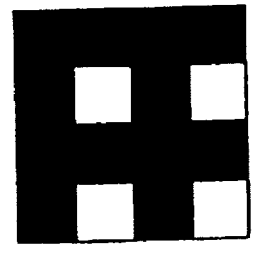
Figure 13A:
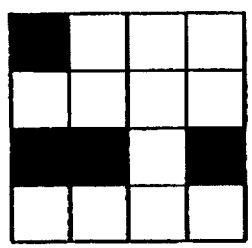
FIG. 13 shows four asymmetric non-overlapping encoding patterns that can be used to reversibly modulate the data to be switched towards four distinct destinations.
Figure 13B:
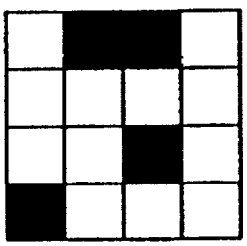
Figure 13C:
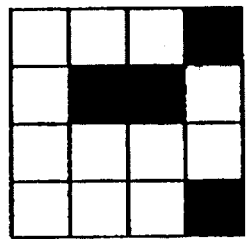
Figure 13D:
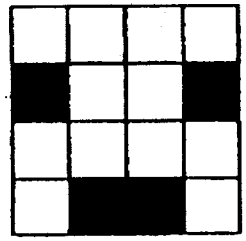

One of the disadvantages of using symmetrical patterns is the likelihood of getting superposed patterns that are identical to other superposed patterns that have been rotated. Thus for instance, the pattern formed in FIG. 12E would be identical to that formed in FIG. 12F or can be made identical to the pattern shown in FIG. 12F by a 180° rotation. The same is true for the superposed patterns shown in FIGS. 12G and 12H. FIG. 12J can be obtained by a 90° clockwise rotation of FIG. 12I, and FIG. 12L can be obtained by a 90° anti-clockwise rotation of FIG. 12K, while FIG. 12D can be obtained by a 90° clockwise rotation of FIG. 12C.

Figure 14A:
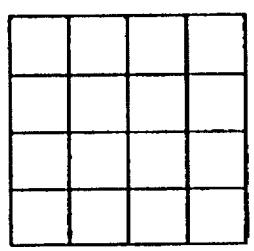
FIG. 14 shows twelve of the sixteen optical patterns that result from the superposition of various combinations of the four basic encoding patterns shown in FIG. 13.
Figure 14B:
Figure 14C:
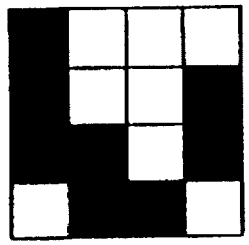
Figure 14D:
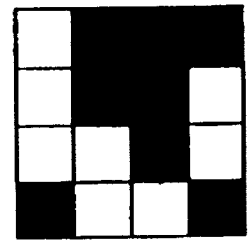
Figure 14E:
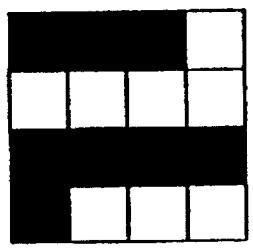
Figure 14F:
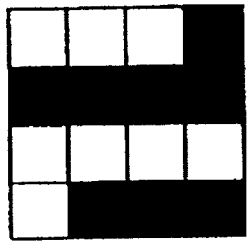
Figure 14G:
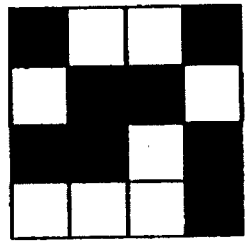
Figure 14H:
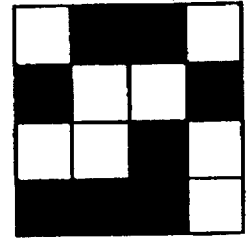
Figure 14I:
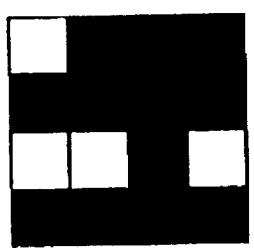
Figure 14J:
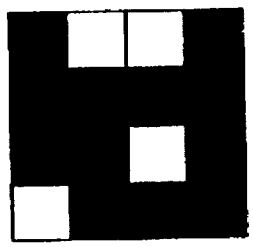
Figure 14K:
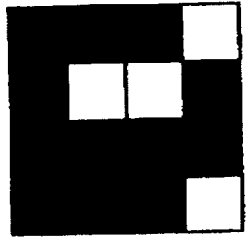
Figure 14L:
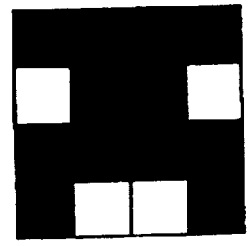
Figure 15A:
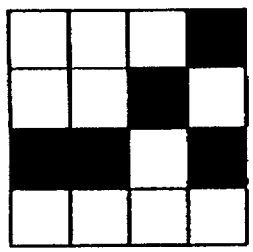
FIG. 15 shows four asymmetric partially-overlapping encoding patterns that can be used to reversibly modulate the data to be switched towards four distinct destinations.
Figure 15B:
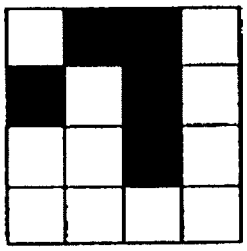
Figure 15C:
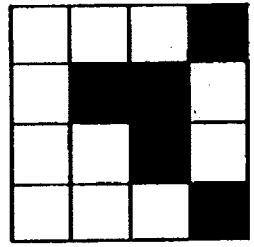
Figure 15D:
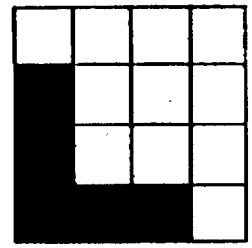
Figure 16A:
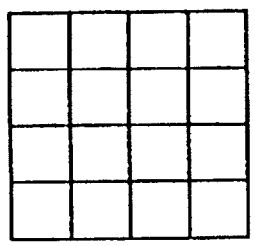
FIG. 16 shows twelve of the sixteen optical patterns that result from the superposition of various combinations of the four basic encoding patterns shown in FIG. 15.
Figure 16B:
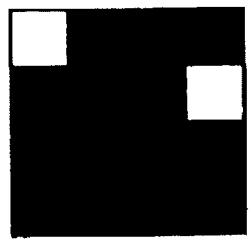
Figure 16C:
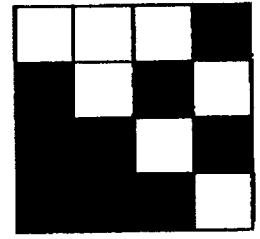
Figure 16D:
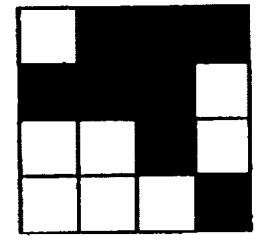
Figure 16E:
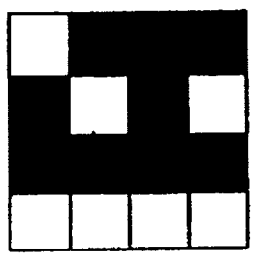
Figure 16F:
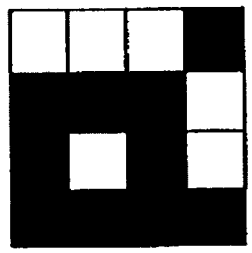
Figure 16G:
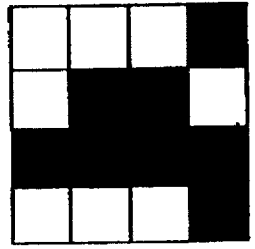
Figure 16H:
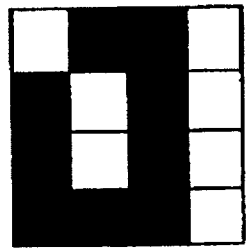
Figure 16I:
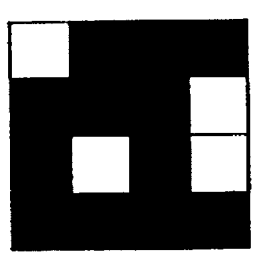
Figure 16J:
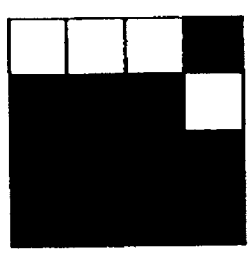
Figure 16K:
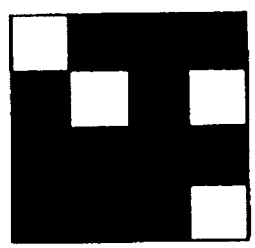
Figure 16L:
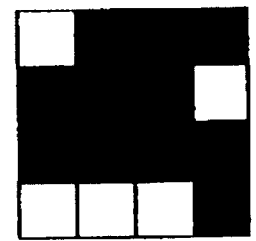

Thus, it can be seen that the use of symmetric basic patterns can thus be seen to be likely to yield superposed patterns that are identical if rotated. As can be seen from FIGS. 13 and 14, the use of asymmetric basic patterns significantly reduces the likelihood of these superposed patterns being rotationally symmetric. However, even the use of the four asymmetric patterns shown in FIG. 13 can still occasionally result in superposed patterns that may be identical if rotated. This can be seen by comparing FIG. 14E with FIG. 14F. FIG. 14F can be obtained by a 180° rotation of FIG. 14E.

As can be seen by a comparison of the sixteen patterns shown in FIGS. 15 and 16, the use of the partially overlapping asymmetric patterns shown in FIG. 15 leads to unique superposed patterns, in which no two superposed patterns are identical to any other, even if rotated 90°, 180° or 270°. This observation can be used to preemptively correct transmission errors resulting from distortion or translation of the image being broadcast. It should be noted, that none of the basic patterns A, B, C or D may completely overlap or be overlapped by any of the other basic patterns in the set because this would lead to at least two of the superposed patterns being identical i.e. indistinguishable.

Optically Encoding the Payload of an ATM Cell

As detailed earlier in the specification, an ATM cell consists of fifty-three octets, consisting further, of a five-octet header segment followed by a forty-eight octet payload segment. To use the optical switching technique and system disclosed in the present invention for switching ATM cells, each fifty-three octet ATM cell is first split into a header portion and a payload portion.

The fifth octet of the five-octet ATM cell header contains the Cyclic Redundancy Checking (CRC) code. It is usual within a telecommunications system to ignore the CRC code in the internal processing of the contents of an ATM cell. This is because the likelihood of errors inside a processing system is low compared to the likelihood of bit-loss etc. in transmissions between a transmitting and a receiving system. The remaining part of the header of an ATM cell contains addressing information which details the destination of that ATM cell. This digital destination address can be used to optically modulate each bit of the payload information for effectuating the non-interfering multiplexed switching detailed herein.

There are 384 binary bits of information in the forty-eight octet payload portion of each ATM cell. In one embodiment of the present invention, the packet payload E/O converters 915 assemble the payload portion of each ATM cell into a 16×24 cell grid as shown by the blackened portion of the 24×24 grid in FIG. 17. Each of the cells of the 16×24 grid is modulated with the addressing patterns A, B, C, D etc. depending on the destination of that ATM cell. The modulated patterns generated by each of the optical encoders 916 are superposed in the optical image coupler 920 and broadcast to all of the optical decoders 931 to 934. Each of the decoders analyses the modulated pattern of each grid cell to determine if that grid cell contains a bit directed at that decoder. The presence of a modulated pattern corresponding to the address of the decoder is interpreted as a specific binary value (0 or 1) in that position of the ATM cell.

In some situations it might be useful to have a symmetric payload grid, for example, if one wishes to minimize the physical size of the optical image coupling and broadcasting systems. Such an embodiment is illustrated in FIG. 18 wherein a 384-bit ATM payload packet is mapped onto 20×20 grid that does not use the center sixteen cells.

Figure 19:
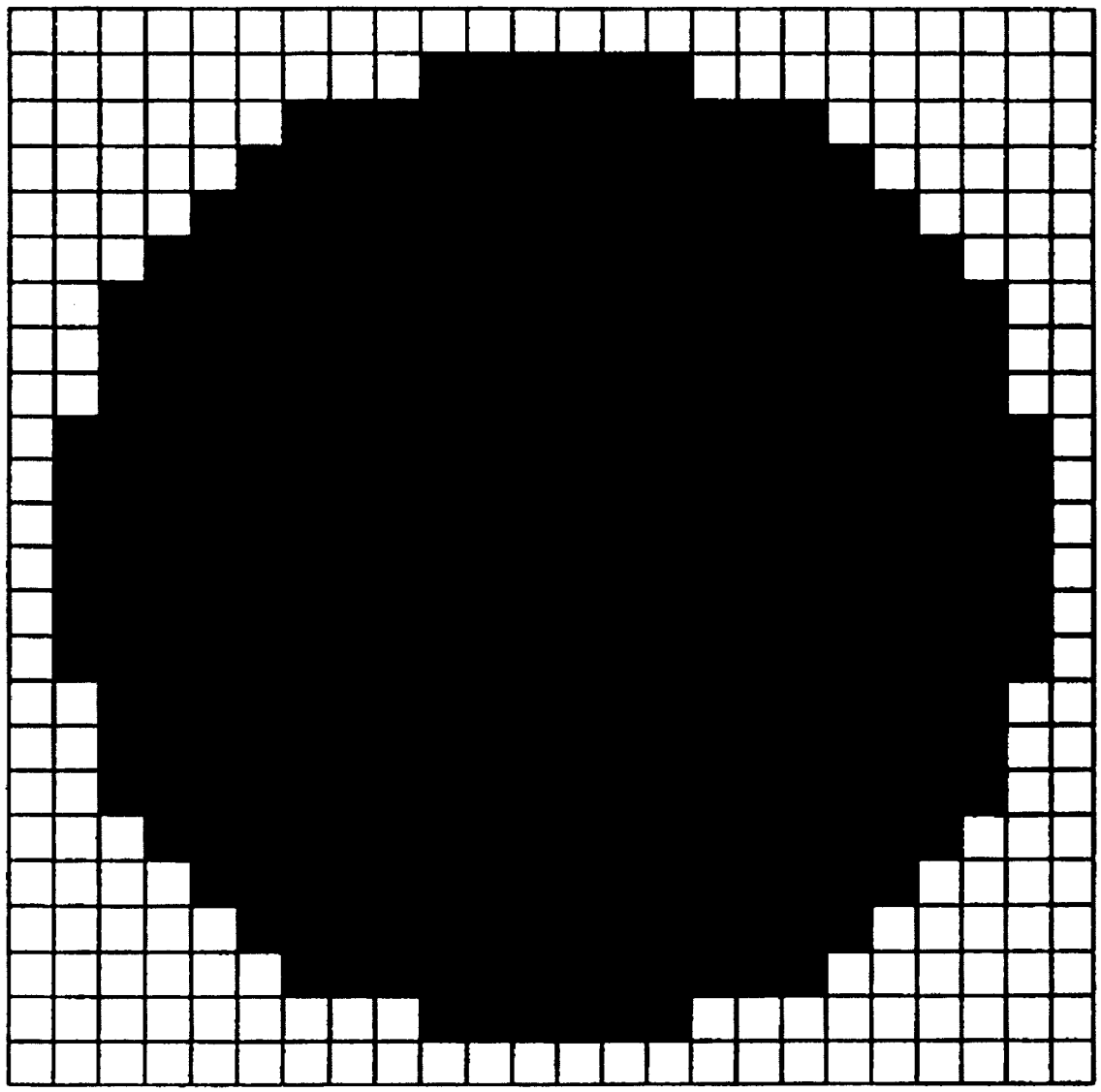
FIG. 19 shows one arrangement of a 384-bit data sequence into a solid 22 by 22 axially-symmetric relatively-circular base grid.

A further refinement of the 384-bit ATM payload can be obtained by using the third embodiment of the base pattern shown in FIG. 19, which has the additional advantage of being relatively symmetric axially. Such axial symmetry can reduce edge dispersion and further reduce the cost of the optics used for coding and decoding the images.

Figure 17:
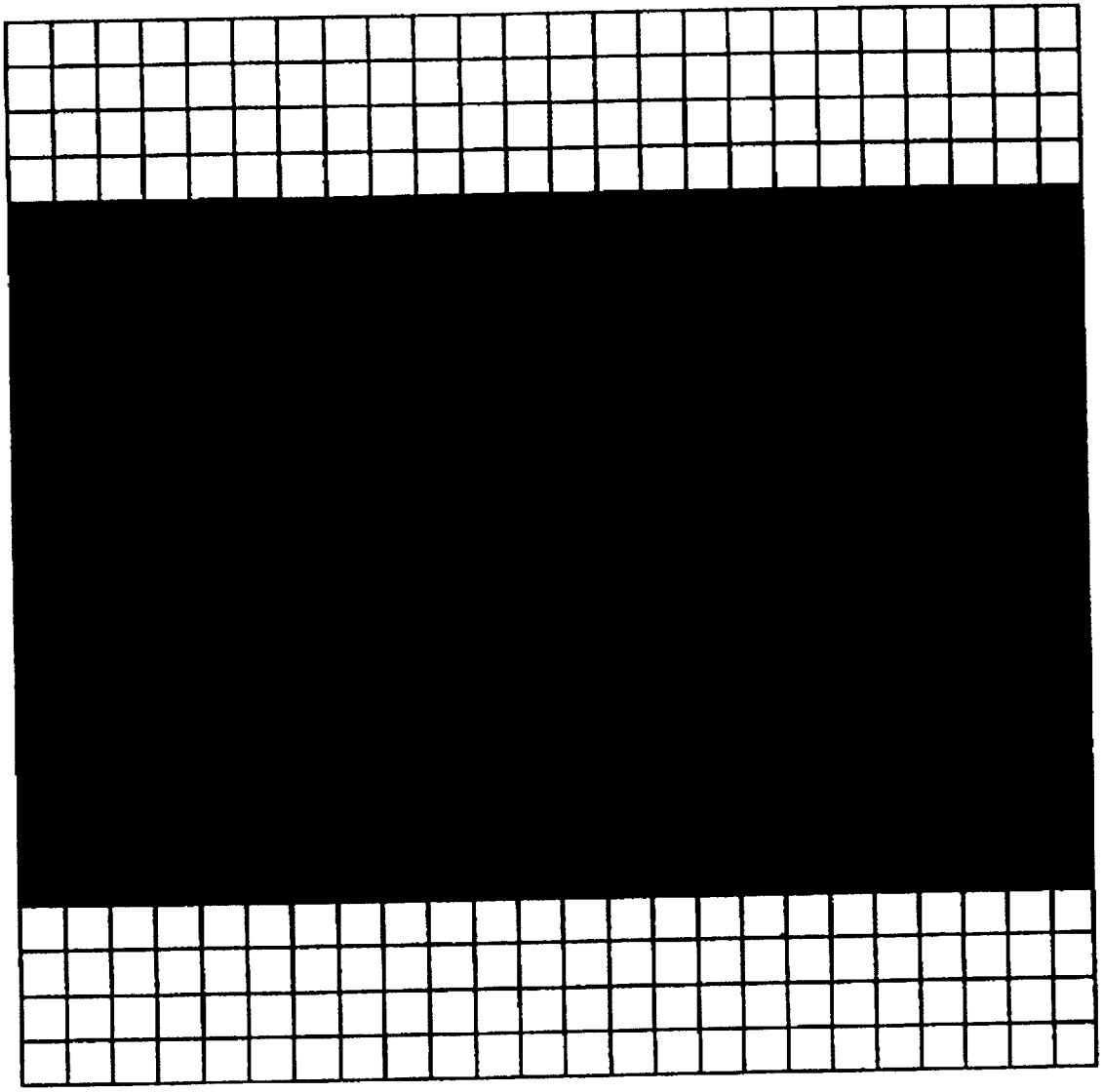
FIG. 17 shows one arrangement of a 384-bit data sequence into a solid 16 by 24 rectangular base grid.
Figure 18:
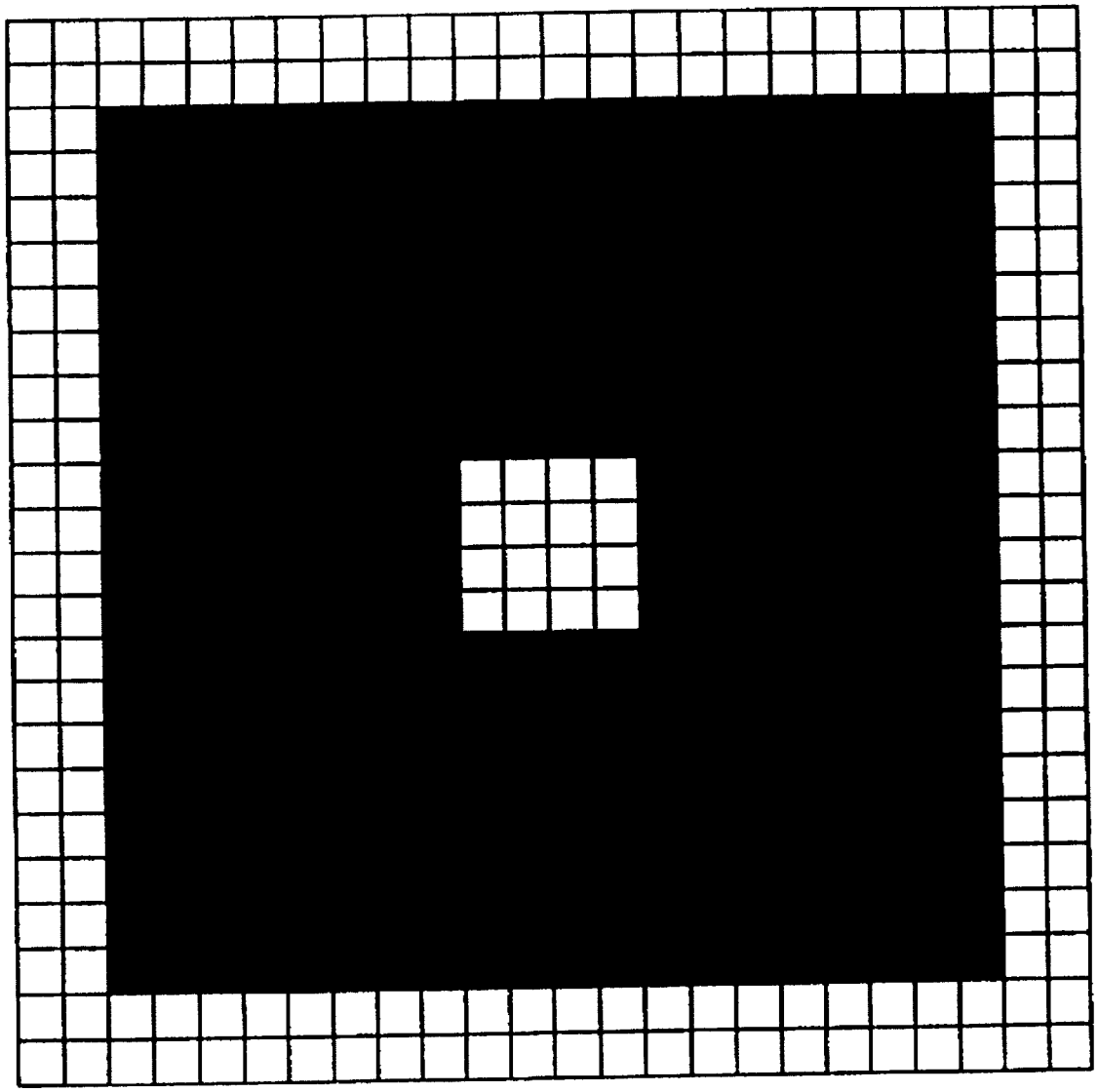
FIG. 18 shows another arrangement of a 384-bit data sequence into a hollow 20 by 20 square base grid.

Other embodiments of assembling the payload portion of an ATM cell than those shown in FIGS. 17 to 19 are also possible. An ATM cell may be broadcast in multiple stages and thus a 384-bit ATM cell can be transmitted as six sixty-four-bit packages with each of the sixty four bits being encoded into an 8×8 basic grid etc.

It is also possible, depending upon the availability of suitable optical encoding and decoding devices, to transmit more than one ATM cell through each optical encoder 916 at a given time. Thus, if more than one ATM cell is going to the same destination, it is possible to group the payload sections of all such ATM cells into a unified package and transmitted all of these ATM cells at the same time to the same destination. In some situations, one may wish to ensure that multi-cell ATM packets are all the same size.

The present invention also permits the individual transmission of different bits of information to different addresses and consequently can be used in future applications that are not limited to ATM system concepts.

In summary, one embodiment of the present invention requires that each of the bits of information be optically modulated using any of the addressing patterns such as those illustrated in FIGS. 11, 13 or 15. As was shown above, the use of any such sets of encoding patterns permits the exact decomposition of images created by superposing combinations of the basic encoding patterns.

Since the payload portion of each ATM cell is usually directed to a single destination address, it may sometimes be unnecessary to modulate each of the payload bits in an ATM cell with the optical patterns A, B, C or D illustrated in FIGS. 11, 13, or 15. Instead, it might be sufficient if a certain area of the base pattern that is auxiliary to the blackened portions shown in FIGS. 17, 18 or 19 contained the destination address image. Then such a combined image can be broadcast to all of the optical decoders 931 to 934 through the optical image coupler 920. The appropriate destination optical decoder would also read in the basic data and transmit it to the appropriate multiplexer while the remaining optical decoders would simply ignore the data that is broadcast to them. However the use of this unmodulated transmission protocol would require that only one ATM cell be switched at each given moment.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. A method for the high-speed switching of electronic data packets from one of a plurality of input ports of a switch to a selected one of a plurality of output ports, said method comprising the steps of:

separating a signal packet incoming at each port into a first time-domain electronic representation of the data-carrying portion of the signal and second time-domain electronic representation of the address-carrying portion of the signal;

transforming the time-domain electronic representations of each of said data portions and said address portions into separate first and second spatial optical image representations thereof, respectively;

modulating said first spatial optical image representation with said second spatial optical image representation to form a unified image that is associated with a specific packet received at each of said plurality of input ports;

multiplexing each of said unified images associated with an input port into a single composite image;

broadcasting said single composite image to a plurality of target sensors, each sensor being associated with a specific destination address of the incoming signal packet;

demultiplexing said composite image into a plurality of separate unified images each being associated with a specific output port, said demultiplexing being done by filtering said composite image using the address image portion corresponding to each destination data port for the incoming signal packet; and transforming each of said plurality of separate unified images received at each output port back into time-domain electronic form comprising an address portion and a data portion.

2. A method for the high-speed parallel switching of a plurality of digital data sequences from one of a plurality of input ports to a selected one of a plurality of output ports, said method comprising the steps of:

separating the address portion of each digital data sequence from the payload portion of the digital data sequence;

determining the destination output port of each digital data sequence using the address portion of the digital data sequence;

generating a unique modulating optical pattern corresponding to said destination output port for modulating the payload portion of the digital data sequence;

generating an encoded optical pattern comprising a plurality of cells by encoding each of the digital data sequences using a preselected conversion protocol;

modulating each cell of said encoded optical pattern using said unique modulating optical pattern to obtain a corresponding modulated optical pattern;

superposing the modulated optical patterns obtained from each of the digital data sequences to form a unitary composite optical pattern;

broadcasting said unitary composite optical pattern to a plurality of destination receivers;

demodulating said unitary composite optical pattern in each of said destination receivers using the unique modulating optical pattern that corresponds to the destination receiver's address; and decoding said demodulated optical pattern at each output port to obtain a switched time-domain digital data sequence.

3. The method of claim 2 for the high-speed parallel switching of a plurality of digital data sequences from one of a plurality of input ports to a selected one of a plurality of output ports, wherein the digital data sequences are ATM cells.

4. The method of claim 2 for the high-speed parallel switching of a plurality of digital data sequences from one of a plurality of input ports to a selected one of a plurality of output ports, additionally comprising the step of:

assembling the payload portion of each digital data sequence into one or more frames suitable for optical switching.

5. The method of claim 2 for the high-speed parallel switching of a plurality of digital data sequences from one of a plurality of input ports to a selected one of a plurality of output ports, additionally comprising the steps of:

repackaging all or a part of the address portion of the original digital data sequence with the payload portion of the original digital data sequence; and forwarding the repackaged digital data sequence to a downstream processor for onward transmission.

6. The method of claim 2 for the high-speed parallel switching of a plurality of digital data sequences from one of a plurality of input ports to a selected one of a plurality of output ports, wherein the step of generating a unique modulating optical pattern is performed by selecting one of a plurality of symmetric non-overlapping modulating patterns such that each selected modulating pattern is associated with no more than a single destination output port.

7. The method of claim 2 for the high-speed parallel switching of a plurality of digital data sequences from one of a plurality of input ports to a selected one of a plurality of output ports, wherein the step of generating a unique modulating optical pattern is performed by selecting one of a plurality of asymmetric non-overlapping modulating patterns such that each selected modulating pattern is associated with no more than a single destination output port.

8. The method of claim 2 for the high-speed parallel switching of a plurality of digital data sequences from one of a plurality of input ports to a selected one of a plurality of output ports, wherein the step of generating a unique modulating optical pattern is performed by selecting one of a plurality of asymmetric partially-overlapping modulating patterns such that each selected modulating pattern is associated with no more than a single destination output port.

9. The method of claim 2 for the high-speed parallel switching of a plurality of digital data sequences from one of a plurality of input ports to a selected one of a plurality of output ports, wherein the step of generating an encoded optical pattern comprising a plurality of cells further comprises the steps of:

translating the information contained in the payload portion of the digital data sequence into binary form; and associating each binary value of 0 or 1 with a specific state of a cell in said encoded optical pattern.

10. The method of claim 9 for the high-speed parallel switching of a plurality of digital data sequences from one of a plurality of input ports to a selected one of a plurality of output ports, wherein the encoded optical pattern is a rectangular grid with 384 cells arranged in 16 rows and 24 columns.

11. The method of claim 9 for the high-speed parallel switching of a plurality of digital data sequences from one of a plurality of input ports to a selected one of a plurality of output ports, wherein the encoded optical pattern is a square grid with 384 cells arranged in 20 rows and 20 columns with the central 16 cells remaining unutilized.

12. The method of claim 9 for the high-speed parallel switching of a plurality of digital data sequences from one of a plurality of input ports to a selected one of a plurality of output ports, wherein the encoded optical pattern is a bilaterally symmetric grid with 384 cells, each quadrant of which has a row of 3 columns, a row of 6 columns, a row of 7 columns, a row of 8 columns, a row of 9 columns, a row of 10 columns, and a row of 11 columns.

13. A system for the high-speed switching of electronic data packets from one of a plurality of input ports of a switch to a selected one of a plurality of output ports, said system comprising:

means for separating a signal packet incoming at each port into a first time-domain electronic representation of the data-carrying portion of the signal and second time-domain electronic representation of the address-carrying portion of the signal;

means for transforming the time-domain electronic representations of each of said data portions and said address portions into separate first and second spatial optical image representations thereof, respectively;

means for modulating said first spatial optical image representation with said second spatial optical image representation to form a unified image that is associated with a specific packet received at each of said plurality of input ports;

means for multiplexing each of said unified images associated with an input port into a single composite image;

means for broadcasting said single composite image to a plurality of target sensors, each sensor being associated with a specific destination address of the incoming signal packet;

means for demultiplexing said composite image into a plurality of separate unified images each being associated with a specific output port, said demultiplexing being done by filtering said composite image using the address image portion corresponding to each destination data port for the incoming signal packet; and means for transforming each of said plurality of separate unified images received at each output port back into time-domain electronic form comprising an address portion and a data portion.

14. A system for the high-speed parallel switching of a plurality of digital data sequences from one of a plurality of input ports to a selected one of a plurality of output ports, said system comprising:

means for separating the address portion of each digital data sequence from the payload portion of the digital data sequence;

means for determining the destination output port of each digital data sequence using the address portion of the digital data sequence;

means for generating a unique modulating optical pattern corresponding to said destination output port for modulating the payload portion of the digital data sequence;

means for generating an encoded optical pattern comprising a plurality of cells by encoding each of the digital data sequences using a preselected conversion protocol;

means for modulating each cell of said encoded optical pattern using said unique modulating optical pattern to obtain a corresponding modulated optical pattern;

means for superposing the modulated optical patterns obtained from each of the digital data sequences to form a unitary composite optical pattern;

means for broadcasting said unitary composite optical pattern to a plurality of destination receivers;

means for demodulating said unitary composite optical pattern in each of said destination receivers using the unique modulating optical pattern that corresponds to the destination receiver's address; and means for decoding said demodulated optical pattern at each output port to obtain a switched time-domain digital data sequence.

15. The system of claim 14 for the high-speed parallel switching of a plurality of digital data sequences from one of a plurality of input ports to a selected one of a plurality of output ports, wherein the digital data sequences are ATM cells.

16. The system of claim 14 for the high-speed parallel switching of a plurality of digital data sequences from one of a plurality of input ports to a selected one of a plurality of output ports, additionally comprising:

means for assembling the payload portion of each digital data sequence into one or more frames suitable for optical switching.

17. The system of claim 14 for the high-speed parallel switching of a plurality of digital data sequences from one of a plurality of input ports to a selected one of a plurality of output ports, additionally comprising:

means for repackaging all or a part of the address portion of the original digital data sequence with the payload portion of the original digital data sequence; and means for forwarding the repackaged digital data sequence to a downstream processor for onward transmission.

18. The system of claim 14 for the high-speed parallel switching of a plurality of digital data sequences from one of a plurality of input ports to a selected one of a plurality of output ports, wherein the means for generating a unique modulating optical pattern further comprises means for selecting one of a plurality of symmetric non-overlapping modulating patterns such that each selected modulating pattern is associated with no more than a single destination output port.

19. The system of claim 14 for the high-speed parallel switching of a plurality of digital data sequences from one of a plurality of input ports to a selected one of a plurality of output ports, wherein the means for generating a unique modulating optical pattern further comprises means for selecting one of a plurality of asymmetric non-overlapping modulating patterns such that each selected modulating pattern is associated with no more than a single destination output port.

20. The system of claim 14 for the high-speed parallel switching of a plurality of digital data sequences from one of a plurality of input ports to a selected one of a plurality of output ports, wherein the means for generating a unique modulating optical pattern further comprises means for selecting one of a plurality of asymmetric partially-overlapping modulating patterns such that each selected modulating pattern is associated with no more than a single destination output port.

21. The system of claim 14 for the high-speed parallel switching of a plurality of digital data sequences from one of a plurality of input ports to a selected one of a plurality of output ports, wherein the means for generating an encoded optical pattern comprising a plurality of cells further comprises:

means for translating the information contained in the payload portion of the digital data sequence into binary form; and means for associating each binary value of 0 or 1 with a specific state of a cell in said encoded optical pattern.

22. The system of claim 21 for the high-speed parallel switching of a plurality of digital data sequences from one of a plurality of input ports to a selected one of a plurality of output ports, wherein the encoded optical pattern is a rectangular grid with 384 cells arranged in 16 rows and 24 columns.

23. The system of claim 21 for the high-speed parallel switching of a plurality of digital data sequences from one of a plurality of input ports to a selected one of a plurality of output ports, wherein the encoded optical pattern is a square grid with 384 cells arranged in 20 rows and 20 columns with the central 16 cells remaining unutilized.

24. The system of claim 21 for the high-speed parallel switching of a plurality of digital data sequences from one of a plurality of input ports to a selected one of a plurality of output ports, wherein the encoded optical pattern is a bilaterally symmetric grid with 384 cells, each quadrant of which has a row of 3 columns, a row of 6 columns, a row of 7 columns, a row of 8 columns, a row of 9 columns, a row of 10 columns, and a row of 11 columns.

* * * * *

UNITED STATES PATENT AND TRADEMARK OFFICE
CERTIFICATE OF CORRECTION

PATENT NO. : 5,729,548
DATED : March 17, 1998
INVENTOR(S) : Wlodek Holender

It is certified that error appears in the above-identified patent and that said Letters Patent is hereby corrected as shown below:

Column 4,
Line 60, replace "50" with -- 53 --

Column 7,
Line 38, replace "customers" with -- customer, --

Column 11,
Line 61, replace "stun" with -- sum --

Signed and Sealed this

Thirtieth Day of October, 2001

Attest:

NICHOLAS P. GODICI
Attesting Officer     Acting Director of the United States Patent and Trademark Office